United States Patent [19]

Tamai et al.

[11] Patent Number: 5,719,256
[45] Date of Patent: Feb. 17, 1998

[54] PROCESS FOR PREPARING POLYCONDENSATION POLYMER COMPOUND

[75] Inventors: Shoji Tamai; Yukiko Mori; Kenichi Goto; Katsuji Watanabe; Osamu Kohgo; Kotaro Shimizu; Toshiyuki Kataoka, all of Fukuoka-ken; Takashi Kuroki, Kanagawa-ken; Wataru Yamashita, Fukuoka-ken; Hideki Mizuta, Fukuoka-ken; Teruyuki Nagata, Fukuoka-ken, all of Japan

[73] Assignee: Mitsu Toatsu Chemicals, Inc., Tokyo, Japan

[21] Appl. No.: 730,362

[22] Filed: Oct. 15, 1996

[30] Foreign Application Priority Data

| | | | |
|---|---|---|---|
| Oct. 19, 1995 | [JP] | Japan | 7-271410 |
| Nov. 10, 1995 | [JP] | Japan | 7-292353 |
| Mar. 13, 1996 | [JP] | Japan | 8-055750 |
| Mar. 22, 1996 | [JP] | Japan | 8-066600 |
| Mar. 29, 1996 | [JP] | Japan | 8-076215 |
| Jun. 6, 1996 | [JP] | Japan | 8-144657 |
| Jul. 19, 1996 | [JP] | Japan | 8-190485 |
| Aug. 8, 1996 | [JP] | Japan | 8-209752 |

[51] Int. Cl.⁶ .................................................. C08G 63/06
[52] U.S. Cl. ................ 528/361; 528/272; 528/274; 528/288; 528/289; 528/293; 528/355; 528/361; 524/714; 524/717
[58] Field of Search .................... 528/272, 274, 528/288, 289, 293, 355, 361; 524/714, 717

[56] References Cited

U.S. PATENT DOCUMENTS

| | | | |
|---|---|---|---|
| 5,457,486 | 10/1995 | Malhotra et al. | 347/105 |
| 5,490,944 | 2/1996 | Suazon | 252/8.8 |
| 5,491,022 | 2/1996 | Smith | 428/224 |
| 5,539,025 | 7/1996 | Smith et al. | 523/418 |
| 5,545,342 | 8/1996 | Beagle et al. | 510/299 |
| 5,605,944 | 2/1997 | Heebner | 523/404 |

*Primary Examiner*—Samuel A. Acquah
*Attorney, Agent, or Firm*—Burns, Doane, Swecker & Mathis, L.L.P.

[57] ABSTRACT

The invention provides a novel preparation process of a polycondensation type polymer, an excellent polymer which is represented by lactic acid and the preparation process of the polymer, a polycondensation agent used for the preparation process, and an intermediate. Specifically, the invention provides a preparation process of the polycondensation type polymer, for example, polyamide, polyimide, polythioester and polyester, comprising bonding a carboxyl group comprising compound with an active hydrogen group comprising compound in the presence of haloiminium salt. The invention provides excellent polylactic acid having a controlled D/L-isomer ratio in the repeating structural units and preparation process of polylactic acid, and further provides a haloiminium salt compound used for the preparation process and an intermediate compound of acid chloride.

74 Claims, 2 Drawing Sheets

PROCESS FOR PREPARING POLYCONDENSATION POLYMER COMPOUND

BACKGROUND OF THE INVENTION

1. Field of the Invention

The present invention relates to a novel process for preparing a polycondensation polymer compound and the invention relates to a novel process for preparing polyhydroxycarboxylic acid, polyhydroxycarboxylic acid, an intermediate for preparing polyhydroxycarboxylic acid, and a process for preparing said intermediate.

2. Description of the Related Art

Polymer compounds have properties which entirely differ from these of monomer compounds and thus have been widely used in many application areas. These polymer compounds are roughly divided into two main classes, that is, polyaddition-type, vinyl-base polymer compounds such as polyvinyl chloride, polyethylene, polypropylene and polystyrene, and polycondensation-type polymer compounds such as polyamide, polyimide, polythioester and polyester.

Specifically, polycondensation-type polymer compounds include many kinds of bonding made in the recurring structural of units of the macromolecule. Consequently, these macromolecular compounds constitute a polymer group having a variety of function and include from a biodegradable polymer compounds to an extremely heat-resistant polymer compound.

In any of these polycondensation-type polymers, polymerization mode is a stepwise, consecutive reaction where a polymer compound is formed by stepwise connecting bond by bond. Consequently, how efficiently forms the essentially required bond is on the basis of the idea in the reaction in organic synthesis.

However, properties of polymer formed greatly differ from the properties of raw material compound and the properties themselves are also diverse. Therefore, under present conditions, it is difficult and not suitable for practical circumstances to infer formation of every polymer compound merely from extended consideration of organic synthetic reaction.

For example, in the case of polyamide synthesis, the fundamental technique of polyamide formation is how efficiently and continuously reacting a carboxyl group with an amino group in the repeated formation of amide bond. For example, aliphatic polyamide such as nylon-66 can be obtained with ease by heating a nylon salt from aliphatic diamine and aliphatic dicarboxylic acid and proceeding a dehydrating reaction. In the case, the reaction proceeds due to moderate nucleophilic property of aliphatic diamine, although dicarboxylic acid has low reactivity. However, aromatic diamine has low nucleophilic property. Thus, it is said to be difficult to obtain high molecular weight polyamide by heating aromatic diamine in combination with a dicarboxylic acid compound.

As countermeasure, processes which have been conventionally investigated and found to be effective are:

1. a process for carrying out polymerization after converting the carboxyl group to a derivative such as an active acid chloride compound,
2. a process for carrying out polymerization after converting the amino group to a more active acetamide group, and
3. a process for converting the amino group to an active isocyanate group and reacting with a carboxyl group by high temperature solution polycondensation process.

However, in any cases, there is a disadvantage that the raw material monomers, that is, the carboxyl group containing compound and amino group containing compound must be converted to high purity derivatives, and a problems that polyamide which can prepared in view of industry is limited to the compound which has a skeleton structure obtained from the derivative existing in the market.

Accordingly, many investigations have been carried out on the direct polycondensation process which forms the amide bond by direct reaction of the carboxyl group with the amino group in the presence of a suitable condensing agent. For example, known polycondensing agents are effective for a polyamide preparation reaction from bis(4-aminophenyl) ether and isophthalic acid or a polyamide preparation reaction from p-aminobenzoic acid. Exemplary polycondensing agent include $(PhO)_3P$, $(PhO)PCl_2$, $[C_3H_7P(O)O]_3$ and $Me_2SiCl_2$. However, any of these processes have problems in view of industry on the requirement for the expensive condensing agent in a large amount and on the treatment of byproduct. These processes have no prospect of going into actual use and still remain in a pilot stage of laboratory.

Polycondensation type polymers such as polyimide which has heterocyclic rings in the polymer skeleton are formed by essentially the same reaction mechanism. Polymers are prepared by bonding the carboxyl group with amino group and successively reacting the resulting amide bond with the 2nd carboxyl group to form an imide ring. Reaction mode is very similar to the polymerization of polyamide in view of the reaction between a carboxyl group and amino group. However, the polyimide polymerization reaction greatly differs from the polyamide polymerization reaction in that, in polyimide polymerization, the resultant polyamide bonding must react with the 2nd carboxyl group to form an imide ring.

Polyimide is generally prepared by previously synthesizing an intermediate called polyamic acid through a ring-opening polyaddition reaction between a diamine compound and tetracarboxylic dianhydride and by successively forming polyimide through a ring-closing imidation reaction.

This is because the reactivity of amino group with acid anhydride is higher than the reactivity of amino group with carboxyl group and can form an amic acid bond with ease. However, the acid anhydride group having a higher reactivity with the amino group generally reacts with moisture in the air with ease and thus has a defect of converting to tetracarboxylic acid. Thus, the acid anhydride leads to the problem of paying close attention to the preservation thereof. The ring-closing imidization reaction of polyamic acid which has been known is merely a thermal imidization process by heating to about 300° C. or a chemical imidization process by using acetic anhydride and pyridine.

In the synthesis of polyester which is represented by liquid crystal polymer and biodegradable polymer, the fundamental technique of polyester formation is how efficiently and continuously reacting a carboxyl group with a hydroxyl group in the repeated formation of ester bond. However, for example, in the case of aromatic polyesters which are represented by liquid crystal polyesters, aromatic carboxylic acid has low reactivity and phenolic hydroxyl group also has low nucleophilic activity. Consequently, it is said difficult to progress dehydration and to form polyester, even though a mixture of these two compounds is heated.

As countermeasure, processes which have been conventionally investigated and found effective are:

1. a process for carrying out polymerization after converting the carboxyl group to a more active derivative such as acid chloride compound or ester compound, and
2. a process for carrying out polymerization after converting the hydroxyl group to a more active acetate group.

However, in any cases, there is a disadvantage that the raw material monomers, that is, the carboxyl group containing compound and hydroxyl group containing compound must be converted to high purity derivatives. Further, esterified compounds of the carboxyl group and acetylated compounds of the hydroxyl group fundamentally undergo an ester exchange reaction, that is, an equilibrium reaction when these compounds are used for the raw material. Consequently, there is a problem that, in order to obtain polyester of high polymerization degree, polymerization must be progressed by heating to a high temperature of 200°–300° C. while removing the byproduct out of the reaction system.

Accordingly, many investigations has been carried out on the direct polycondensation process which forms the ester bond by direct reaction of the aromatic carboxyl group with the phenolic hydroxyl group in the presence of a suitable condensing agent. Known polycondensing agents which are suited for the polyester preparation reaction from bisphenol A and isophthalic acid/terephthalic acid include, for example, $Ph_2POCl$, $POCl_3$—LiCl and p-toluenesulfonyl chloride.

However, any of these processes have problems in view of industry on the requirement for the expensive condensing agent in a large amount and on the treatment of byproduct. These processes have no prospect of going into actual use and still remain in a pilot stage of laboratory.

Further, biodegradable aliphatic polyesters are excellent in mechanical properties, physical properties and chemical properties, and additionally have biodegradable function which can be decomposed under natural environment without doing harm to others and finally converted by microorganisms to water and carbon dioxide. Thus, biodegradable polyesters have been recently focused attention in various fields such as medical materials and substitutes for general purpose resin. In recent years, many investigations have been carried out on the biodegradable polyesters.

For example, the process for preparing high molecular weight aliphatic polyester from polyhydric alcohol and polycarboxylic acid are, as well-known, based upon the deglycolation of a terminal hydroxyl group in low molecular weight polyester. Consequently, concentration of terminal group remarkably decreases with increase in molecular weight. Decomposition reaction due to temperature in the ester exchange step is also added and molecular weight increase is restricted. Particularly, such tendency is remarkable in aliphatic polyester. For example, in the case of preparing high molecular weight saturated polyester by conventional deglycolation reaction under reduced pressure, the molecular weight reaches to a maximum and successively starts to decrease.

In such a case, it is difficult by conventional deglycol reaction to obtain aliphatic polyester having a molecular weight enough to form a tough film. In other words, the molecular weight attained in the aliphatic polyester could not form a film having properties of practical utility.

Further, the process requires to carry out the reaction under high vacuum at high temperature and thus has a problem of mounting up the production facility and cost.

Japanese Laid Open Patent Hei 7-228675 has disclosed a process for preparing high molecular weight polyester. In the processes, dehydration polycondensation is carried out by heating polyhydric alcohol and polycarboxylic acid in an organic solvent, distilling out formed water with the organic solvent, bringing the organic solvent into contact with a drying agent, and returning the dehydrated organic solvent to the reaction system.

However, the process also requires to carry out the reaction under high vacuum at high temperature, and has a problem of expensive manufacturing facility.

Japanese Laid-Open Patent Hei 4-189822 and 4-189823 have described a preparation process of high molecular weight polyester. In the process, a diisocyanate compound having from 1/10 to 2 equivalent of isocyanate group for a hydroxyl group is added in a molten state higher than the melting point to saturated polyester having a number average molecular weight of 5,000 or more, having substantially a hydroxyl group as a terminal group, and having a compound of 8 carbon atoms or more or a mixture thereof as an acid ingredient.

However, the above mentioned process has a problem that the isocyanate group remains in the polymer chain.

Further, many investigations have been made on polyhydroxycarboxylic acids such as polylactic acid and polyglycolic acid which are also divided in the class of biodegradable aliphatic polyester.

In these polyhydroxycarboxylic acids, polylactic acid, in particular, is constituted of lactic acid which also exists in a human body and is thus focused much attention as a biodegradable polymer which has safety for human body.

Conventionally, these polyhydroxycarboxylic acids have been generally prepared by converting hydroxycarboxylic acid, for example, lactic acid or glycolic acid to the dimer, lactide or glycolide, and successively carrying out ring-opening polymerization of the dimer in the presence of a catalyst.

U.S. Pat. No. 2,703,316 has disclosed a preparation process of poly-D,L-lactic acid by once oligomerizing D,L-lactic acid, successively isolating lactide at 200°–250° C. under reduced pressure, further recrystallizing a few times, from ethyl acetate, and carrying out ring-opening polymerization of thus obtained racemi-lactide having a melting point of 120° C. or more. The resultant poly-D,L-lactic acid has an inherent viscosity of 0.45 dl/g or more and can be processed into a tough film or filament.

However, in the process, the reaction procedures are complex and the polymer obtained is expensive. Further, some kinds of hydroxycarboxylic acid do not form dimer, and the process can not be applied in such cases. That is, variation of copolymerization is limited and modification of properties by copolymerization is restricted.

On the other hand, Japanese Laid-Open Patent Sho 59-96123, Japanese Laid-Open Patent Hei 6-65360 and U.S. Pat. No. 4,273,920 have disclosed preparation process of polyhydroxycarboxylic acid by the direct heat-dehydration polycondensation process of hydroxycarboxylic acid. In these cases, polyhydroxycarboxylic acid is prepared under violent conditions in view of heat energy, for example, at high vacuum of 100 mmHg or less/high temperature of 200°–260° C. or at high temperature of 180° C. or more in the presence of ion exchange resin catalyst. Thus, coloration, contamination of impurities due to heat decomposition and other problems have been found on the polymer obtained. Racemization also progresses in the heat polymerization and it becomes difficult to control the D,L-ratio in the repeating units of the polymer. Accordingly, polylactic acid obtained differs from lot to lot in crystallinity and solubility in solvents, and has many problems in view of quality control as a manufacturing process in industry. Consequently, the cyclic dimer process and the direct-heat dehydration polycondensation process have led to many problems which include complex preparation steps and increase in manufacturing cost due to irregularity of polymer properties obtained.

On the other hand, polylactic acid is a kind of polyesters and thus general preparation processes of polyesters are also thought applicable.

One of the known preparation processes of polyesters is a polymerization process by dehydrochlorination from dicarboxylic acid chloride and diol or from hydroxycarboxylic acid chloride. It has been reported that selectivity in chlorination of the carboxyl group is relatively high and can provide desired hydroxycarboxylic acid chloride in the esterification of dicarboxylic acid and diol or in the esterification by hydroxycarboxylic acid having a benzene ring, when thionyl chloride is used as a chlorinating agent in particular. [Makromol. Chem., 182, 681–686 (1981)].

On the other hand, it has been known that hydroxycarboxylic acid chloride, acid chloride of lactic acid and/or oligomer thereof in particular, is unstable, and the example which specifically indicates the existence of such chloride has not been known at all. Japanese Patent Publication Hei 4-3763 teaches a preparation process of polylactide, polyglycolide and copolymer of them having high molecular weight, by reacting polylactide or polyglycolide having low molecular weight with thionyl chloride, oxalyl chloride, succinyl chloride or terephthaloyl chloride, and successively carrying out polycondensation of them. However, acid chloride of lactic acid and/or oligomer thereof has not been confirmed. The polymer obtained has low polymerization degree and thus, conversion of carboxyl group to acid chloride by these chlorinating agents is anticipated to have a low selectivity.

Research examples by using haloiminium salts have been known for a long time as disclosed in T. Fujisawa et al, Chem. Soc. Jpn., Chem. Lett., 1891 (1982), Japanese Laid-Open Patent Sho 62-45223, Hei 4-308588, Hei 5-97714, Hei 6-2347251 and Hei 6-247946. In any case, the disclosure merely shows effectiveness as an esterifying agent for alcohol and carboxylic acid, halogenating agent of primary alcohol, preparation agent of nitrile from aldehydeoxime, carbodiimide preparation agent from thiourea, and preparation agent of 4-oxo-1,3-benzoxazine from N-acylanthranilic acid.

SUMMARY OF THE INVENTION

The present invention has been completed in order to overcome the above problems in the conventional process for preparing a polycondensation polymer.

The object of the invention is to provide a process for preparing a polycondensation polymer by using a novel polycondensation agent and the polymer thus prepared, and to provide the polycondensation agent used for the preparation process and intermediate. For example, the invention provides a preparation process of polylactic acid from lactic acid by using the novel polycondensation agent and polylactic acid obtained by the process, the polycondensation agent used for the process and the intermediate for preparing polylactic acid.

That is, the present invention provides a process for preparing a polycondensation polymer, for example, polyamide, polyimide, polythioester and polyester, by bonding a carboxyl group comprising compound with an active hydrogen group comprising compound in the presence of a haloiminium salt.

Further, the invention provides a process for preparing polylactic acid in a short time by carrying out polycondensation of lactic acid and/or its oligomer in the presence of a haloiminium salt, a polycondensation agent used for the process, and acid chloride which is an intermediate of polylactic acid.

The invention provides excellent polylactic acid having a controlled DL-isomer ratio in the repeating structural units of the polymer.

The invention provides poly-L-lactic acid having a D-isomer content of 1% or less in a repeating structural units.

DETAILED DESCRIPTION OF THE PREFERRED EMBODIMENTS

Figure 1:
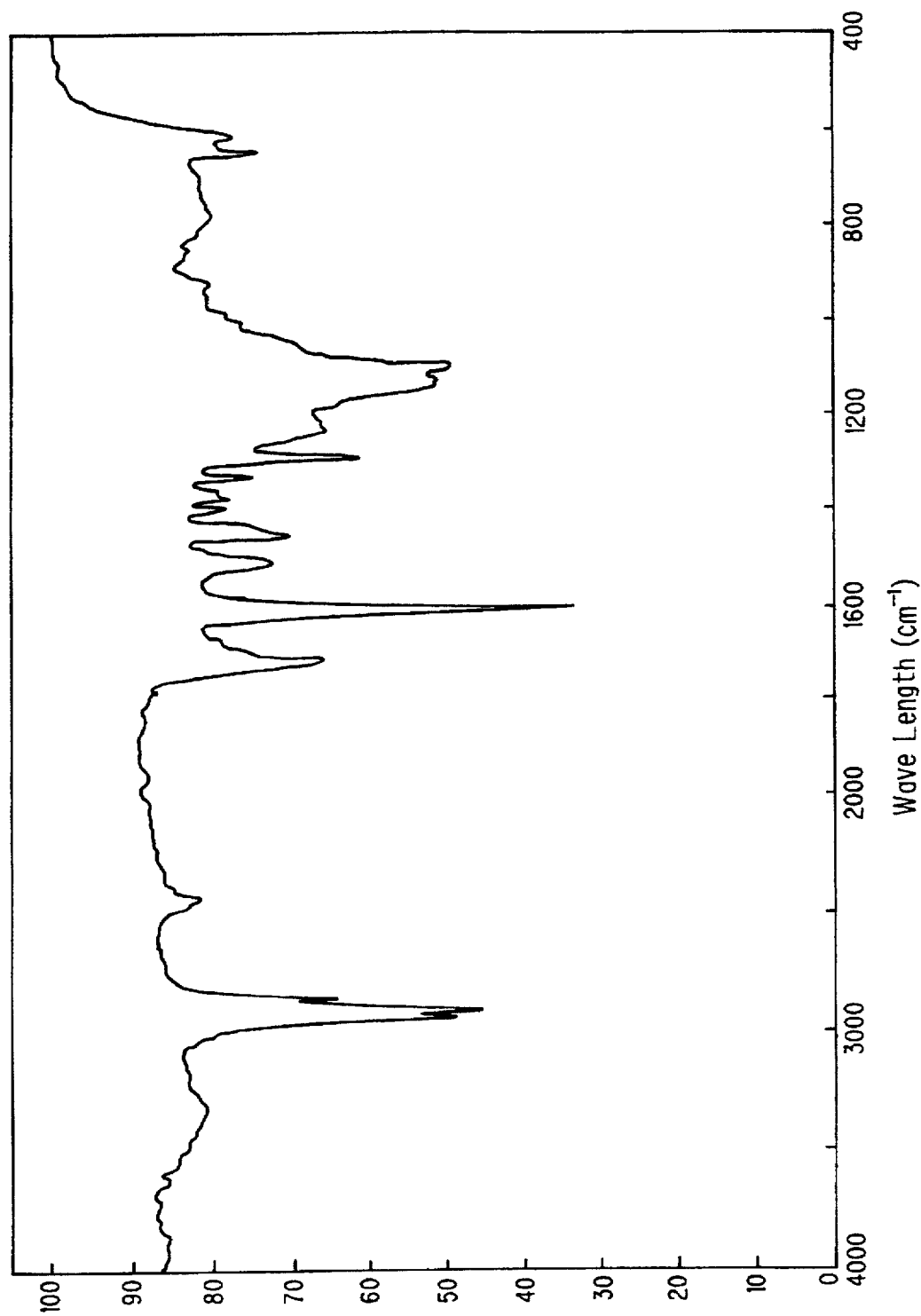
FIG. 1 illustrates an IR-spectrum of 1,3-dibutyl-2-chloroimidazolinium chloride.

The present invention comprises the following embodiments,

1) A process for preparing a polymer comprising carrying out polycondensation of a carboxyl group comprising compound and an active hydrogen group comprising compound in the presence of a haloiminium salt as a polycondensation agent, 2) The process according to 1) wherein polycondensation of a compound comprising a carboxyl group and an active hydrogen group in the same molecule is carried out, 3) The process according to 1) wherein polycondensation of a compound comprising two or more carboxyl groups and a compound comprising two or more active hydrogen groups is carried out, 4) The process according to 1) wherein polycondensation of a compound comprising one or more carboxyl groups and one or more active hydrogen groups in the same molecule and a compound comprising two or more carboxyl groups and/or a compound comprising two or more active hydrogen groups is carried out, 5) The process according to anyone of 1)–4) wherein the active hydrogen group is an amino group and the polymer is polyamide, 6) The process according to anyone of 1)–4) wherein the active hydrogen group is an amide group and the polymer is polyimide, 7) The process according to anyone of 1)–4) wherein the active hydrogen group is a thiol group and the polymer is polythioester, 8) The process according to anyone of 1)–4) wherein the active hydrogen group is a hydroxyl group and the polymer is polyester, 9) The process according to 2) wherein the compound comprising the carboxyl group and the active hydrogen group in the same molecule is a hydroxycarboxylic acid and/or an oligomer of the same and the polymer is polyester, 10) The process according to 3) wherein the compound comprising two or more active hydrogen groups is a compound comprising two or more hydroxyl groups and the polymer is polyester, 11) The process according to 4) wherein the compound comprising one or more carboxyl groups and one or more active hydrogen groups in the same molecule is hydroxycarboxylic acid, and the compound comprising two or more active hydrogen groups is a compound comprising two or more hydroxyl groups, and the polymer is polyester, 12) The process according to 9) wherein hydroxycarboxylic acid and/or the oligomer of the same is an aromatic compound and the polymer is aromatic polyester, 13) The process according to 9) wherein hydroxycarboxylic acid and/or the oligomer of the same is an aliphatic compound and the polymer is aliphatic polyester, 14) The process according to 10) wherein the compound comprising two or more hydroxyl groups is an aromatic compound and/or an aliphatic compound and the polymer is polyester, 15) The process according to 11) wherein hydroxycarboxylic acid is an aromatic compound and/or an aliphatic compound and the compound comprising two or more hydroxyl groups is an aliphatic compound and the polymer is polyester, 16) The process according to 13) wherein hydroxycarboxylic acid is lactic acid and/or the oligomer of the same and the polymer is polylactic acid, 17) The process according to 13) wherein hydroxycarboxylic acid is an oligomer obtained from butanediol and succinic acid and lactic acid and/or an oligomer of the same and the polymer is aliphatic copolyester, 18) The process according to 14) wherein the compound comprising two or more hydroxyl groups in butanediol and the compound comprising two or more carboxyl groups is succinic acid and the polymer is aliphatic polyester, 19) The process according to 15) wherein hydroxycarboxylic acid is lactic acid and/or the oligomer of the same, and the compound comprising two or more hydroxyl groups is butanediol, and the compound comprising two or more carboxyl groups is succinic acid, and the polymer is aliphatic copolyester, 20) The process for preparing polylactic acid of 16) wherein polycondensation is carried out at temperature at 100° C. or less presence of a base, 21) The process for preparing polylactic acid of 20) wherein the base for use is pyridine, 22) The process for preparing polylactic acid of 20) wherein lactic acid and the oligomer of the same contain 1,800 ppm or less of monocarboxylic acids and/or alcohols as impurities for lactic acid unit, 23) Polylactic acid prepared by the process according to 20) wherein the total amount of monocarboxylic acids and/or alcohols and/or 2-halopropionic acid which is formed by hydrolysis of polylactic acid obtained, is 1800 ppm or less for lactic acid unit, 24) A process for preparing polylactic acid comprising reacting acid halide of lactic acid and/or an oligomer of the same represented by the formula (1):

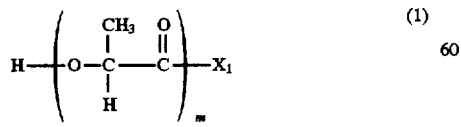

wherein $X_1$ is a halogen atom and m is an integer of 1 or more,

25) The process according to 24) wherein the reaction is carried out at temperature of 180° C. or less, 26) The process according to 24) wherein the reaction is carried out in the presence of a base, 27) The process according to 26) wherein the reaction is carried out at temperature of 120° C. or less, 28) Poly-L-lactic acid comprising 1% or less of D-isomer ratio in the repeating structural units, 29) Polylactic acid according to 28) wherein a weight average molecular weight is 50,000–1,000,000, 30) A process for preparing acid halide of lactic acid and/or an oligomer of the same represented by the formula (1):

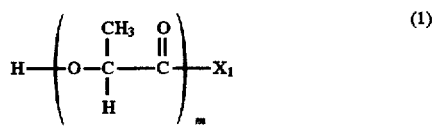

wherein $X_1$ is a halogen atom and m is an integer of 1 or more, comprising reacting haloiminium salt with lactic acid and/or an oligomer of the same, 31) The process according to 30) wherein m is 1–13, 32) The process according to 30) wherein m is 14–83, 33) The process according to 30) wherein m is 84–555, 34) The process according to 30) wherein m is 556 or more, 35) An acid halide of lactic acid and/or an oligomer of the same represented by the formula (1):

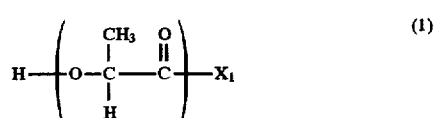

wherein $X_1$ is a halogen atom and m is an integer of 1 or more,

36) The acid halide of lactic acid and/or an oligomer according to claim 35 wherein m is 1–13, 37) The acid halide of lactic acid and/or an oligomer according to claim 35 wherein m is 14–83, 38) The acid halide of lactic acid and/or an oligomer according to claim 35 wherein m is 84–555, 39) The acid halide of lactic acid and/or an oligomer according to claim 35 wherein m is 556 or more, 40) The acid halide of lactic acid and/or an oligomer according to anyone of claim 35~39 wherein 1800 ppm or less of 2-halopropionic acid is formed by hydrolysis of the same, 41. The process according to anyone of claim 1~4 wherein haloiminium salt is represented by the formula (2):

wherein $X_2$ and $X_3$ are individually a halogen atom and may be the same or different, 42) The process according to anyone of 1)–4) wherein haloiminium salt is represented by the formula (3):

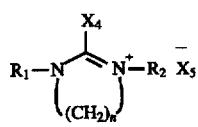 (3)

wherein $R_1$ and $R_2$ are individually a lower alkyl group and may be the same or different, $X_4$ and $X_5$ are individually a halogen atom and may be the same or different, and n is an integer of 2 or 3, 43) The process according to anyone of 1)–4) wherein haloiminium salt is represented by the formula (4):

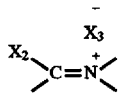 (4)

wherein $R_3$ is an alkyl group of 1–4 carbon atoms, 44) 1,3-Dibutyl-2-chloro-imidazolinium chloride, 45) The process according to 30) wherein haloiminium salt is represented by the formula (2):

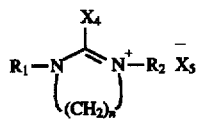 (2)

wherein $X_2$ and $X_3$ are individually halogen atoms and may be the same or different, 46) The process according to 30) wherein haloiminium salt is represented by the formula (3):

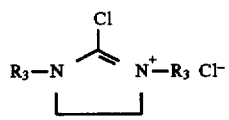 (3)

wherein $R_1$ and $R_2$ are individually a lower alkyl group and may be the same or different, $X_4$ and $X_5$ are individually a halogen atom and may be the same or different, and n is an integer of 2 or 3, 47) The process according to 30) wherein haloiminium salt is represented by the formula (4):

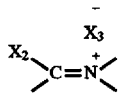 (4)

wherein $R_3$ is an alkyl group of 1–4 carbon atoms.

48) The process according to 30) wherein haloiminium salt is 1,3-dibutyl-2-chloro-imidazolinium chloride, 49) A polymer obtained by polycondensation of hydroxycarboxylic acid having an asymmetric carbon atom, wherein the ratio of D-isomer content to L-isomer content is maintained for the D/L ratio of lactic acid raw material and an weight average molecular weight is 50,000–1,000,000.

The carboxyl group comprising compound and active hydrogen group comprising compound which are used in the invention can be any compound selected from aliphatic compounds, aromatic compounds and heterocyclic compounds so long as these compounds can be subjected to polycondensation. No particular limitation is imposed upon the molecular weight. Further, the carboxyl group and the active hydrogen group can be comprised in the same molecule or in different molecules. When the carboxyl group and the active hydrogen group are in different molecules, each molecule must have two or more carboxyl group or two or more active hydrogen group, respectively. The compound comprising the carboxyl group and the active hydrogen group in the same molecule can be used in combination with the compound comprising these groups in different molecules. In the case, a so-called copolymer can be prepared. No particular limitation is imposed upon numbers of the carboxylic acid group and the active hydrogen group. However, in order to obtain a straight chain polymer, numbers of the carboxyl group is preferably equal to numbers of the active hydrogen group.

The term "active hydrogen group" in the invention is taught in Kohler (J.A.C.S., 49, 6181 (1927)) and means any active hydrogen group which is determined by a Zerewitinoff test. The active hydrogen group generally includes a hydroxyl, thiol, amino, amide and carboxyl group.

The haloiminium salt in the invention is preferably a compound comprising in a molecule the structure represented by the formula (2) and the compound may be a cyclic or not:

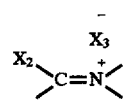 (2)

wherein $X_2$ and $X_3$ are individually halogen atoms and may be the same or different. However, the compound preferred in view of stability is haloiminium salt represented by the formula (3):

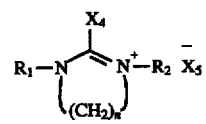 (3)

wherein $X_4$ and $X_5$ are individually halogen atoms acid may be the same or different, $R_1$ and $R_2$ are individually a lower alkyl group and may be the same or different, and n is an integer of 2 or 3. Further, the compound more preferred in view of stability and supply is chloroiminium salt represented by the formula (4):

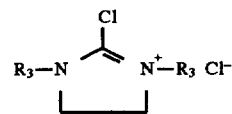 (4)

wherein $R_3$ is an alkyl group of 1–4 carbon atoms.

Haloiminium salt which is used in the invention includes specifically N,N-dimethylchloromethyleneiminium chloride, N,N-diphenylchlorophenylmethyleneiminium chloride, N,N-diphenylchloro-p-methoxyphenylmethyleneiminium chloride, N,N,N',N'-tetramethylchloroform-amidinium chloride, 2-chloro-1,3-dimethylimidazolinium chloride, 2-chloro-1,3-diethylimidazolinium chloride, 2-chloro-1,3-dipropylimidazolinium chloride, 2-chloro-1,3-dibutylimidazolinium chloride, 2-chloro-1,3-dihexylimidazolinium chloride, 2-chloro-1,3-dicyclohexylimidazolinium chloride, 2-chloro-1,3-diphenylimidazolinium chloride and 2-chloro-1,3-dimethyl-3,4,5,6-tetrahydropyrimidinium chloride, N,N,N',N'-tetraethylchloroform-amidinium chloride, N,N,N',N'-tetrabutylchloroform-amidinium chloride, N,N-diethyl-N', N'-dipropylchloroform-amidinium chloride, N,N-diethyl-N', N'-dibutylchloroform-amidinium chloride, N,N-diethyl-N', N'-diallylchloroform-amidinium chloride; and fluorides, bromides and iodides. In these compounds, 2-chloro-1,3-dimethylimidazolinium chloride, 2-chloro-1,3-diethylimidazolinium chloride, 2-chloro-1,3-dipropylimidazolinium chloride and 2-chloro-1,3-dibutylimidazolinium chloride which are represented by the formula (4) are preferably used in view of stability and supply.

Haloiminium salts which are preferably used include 2-chloro-1,3-dimethylimidazolinium chloride wherein $R_3$ is methyl and 2-chloro-1,3-dibutylimidazolinium chloride wherein $R_3$ is butyl in the formula (4).

These haloiminium salts can be used without any problem in the form of powder or in the form of solution or suspension in a proper solvent. Further, several kinds of haloiminium salt can be used simultaneously.

The amount of haloiminium salt used in the invention is usually 0.85–6 times for mol of carboxyl group. In order to obtain a polymer having a sufficiently high molecular weight, the amount is preferably a stoichiometric or more.

The polycondensation reaction in the invention consists of reaction for forming acid halide by halogenating a carboxyl group with haloiminium salt (the first step reaction) and successive polycondensation of acid halide (the second reaction). These reactions can be carried out successively or at the same time in the invention.

When haloiminium salt is used for polycondensation catalyst, haloiminium salt progresses a halogenation reaction and a polymer forming reaction while releasing hydrogen halide. Accordingly, hydrogen halide is preferably removed from the reaction system in order to obtain a high molecular weight polymer. A process for heating and removing in the form of hydrogen halide gas or a process for neutralizing with a basic compound and removing out of the system in the form of a salt, are generally used for removing hydrogen halide. The high molecular weight polymer can be obtained without problem by any processes. When hydrogen halide in the system is removed by using a basic compound, sodium hydroxide, pyridine, picoline, triethylamine and other inorganic and organic bases can be used. No particular restriction is imposed upon these bases.

The reaction temperature for preparing the polymer by reacting the compound having a carboxyl group with the compound having an active hydrogen group in the presence of haloiminium salt differs depending upon the kinds of haloiminium salt and raw materials used. No particular limitation is put upon the reaction temperature. The reaction can be carried out in the range of 0°–300° C. When the temperature exceeds 300° C., haloiminium salt itself is liable to decompose. When the reaction is carried out at 300° C. or less, the reaction temperature can be arbitrarily selected depending upon the presence or absence and kind and amount of the solvent. The reaction of the invention can be sufficiently carried out even at room temperature.

The process of the invention can be carried out with or without a solvent. When the solvent is used, the solvent differs depending upon the skeleton structure and molecular weight of the desired polymer. However, any solvent can be fundamentally used so long as the solvent is inert to the haloiminium salt and raw material compound used. Exemplary solvents include dichloromethane, ethylenedichloride, chloroform, benzene, xylene, chlorobenzene, hexane, cyclohexane, dimethylacetamide, 1,3-dimethyl-2-imidazolidinone and dimethyl sulfone.

The reaction pressure can be arbitrarily selected in relation to reaction temperature and the efficiency for removing the hydrogen halide byproduct out of the system.

In order to present contamination of external moisture and to remove hydrogen halide byproduct, the interior of the reaction system is preferably purged with an inert gas such as nitrogen or argon. An open system and closed system can be used without any problem so long as hydrogen halide byproduct can be removed.

The polymer obtained in the process of the invention can provide a variety of weight average molecular weight by arbitrarily selecting presence or absence of the solvent, kind and amount of the solvent, reaction temperature, reaction time, and kind and amount of the haloiminium salt used.

In the process of the invention, exemplary compounds having a carboxyl group include succinic acid, oxalic acid, malonic acid, glutaric acid, adipic acid, pimelic acid, suberic acid, azelaic acid, sebacic acid, undecanoic diacid, dodecanoic diacid, phenylsuccinic acid, 1,4-phenylenediacetic acid, maleic acid, fumaric acid and other aliphatic polycarboxylic acid, and aromatic polycarboxylic acids having the structure shown below.

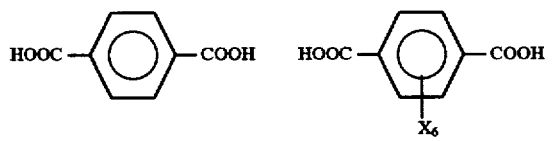

($X_6$ is a halogen atom or an alkyl group)

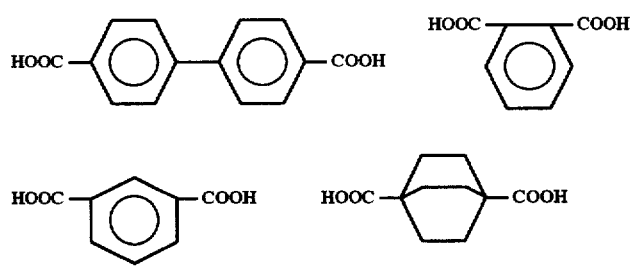

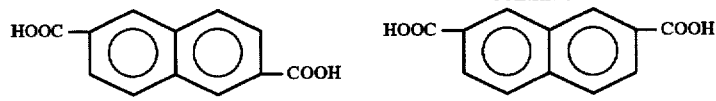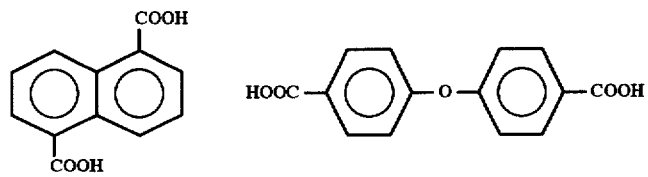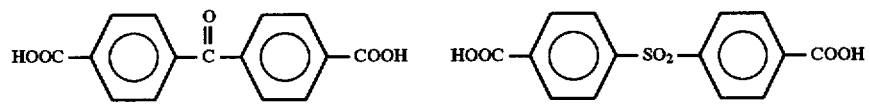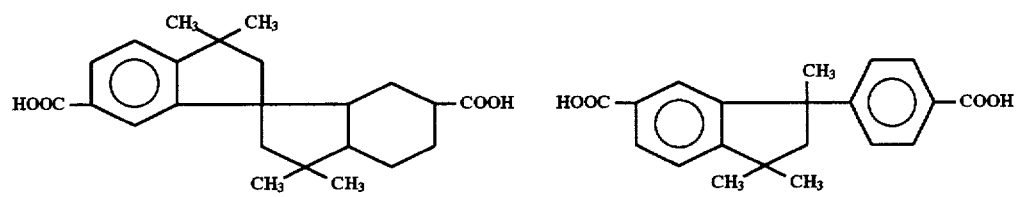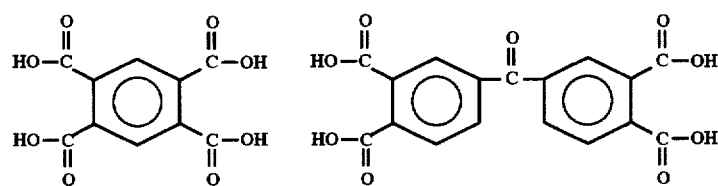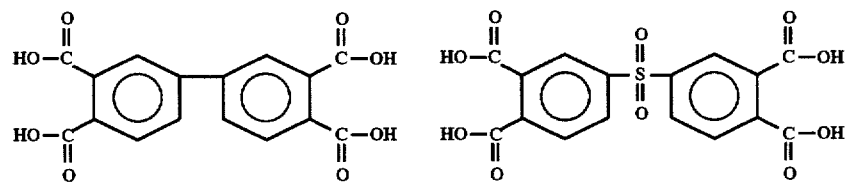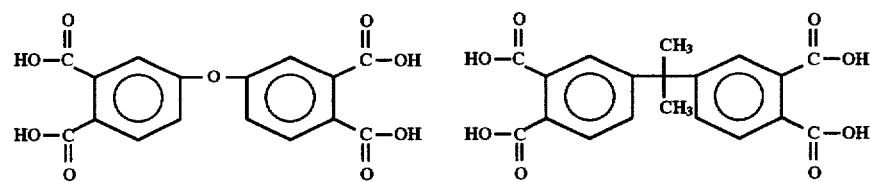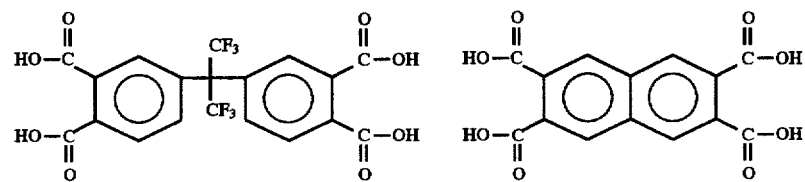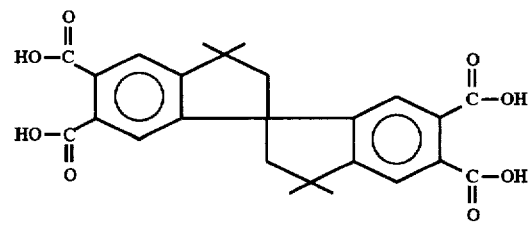

-continued

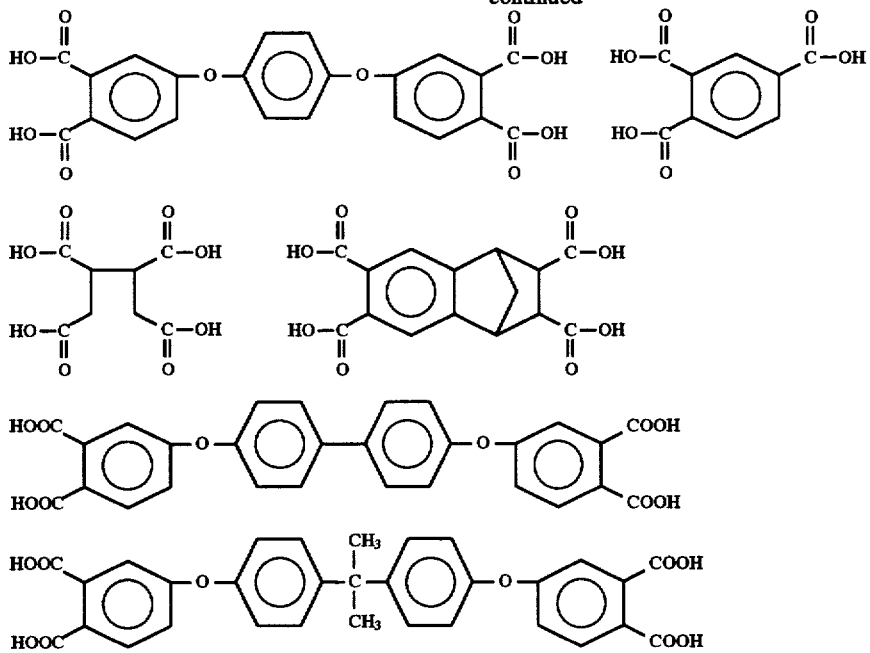

Representative compounds having a carboxyl group and active hydrogen group in the same molecule include, for example, aminobenzoic acid and other aromatic aminocarboxylic acids; aspartic acid and other amino acids and oligomers of these acids; polyamic acids represented by the formula (5):

$$\left( \begin{array}{c} \underset{|}{H} \underset{\|}{O} \quad \underset{\|}{O} \underset{|}{H} \\ -N-C \diagdown \diagup C-N-R_5- \\ R_4 \\ HO-C \diagup \diagdown C-OH \\ \underset{\|}{O} \quad \underset{\|}{O} \end{array} \right)_n$$

(5)

wherein $R_4$ is a specific tetravalent organic group, $R_5$ is a specific bivalent organic group, and n is an integer of 1 or more; 2-mercaptopropionic acid, 3-mercaptopropionic acid, mercaptoacetic acid, 3-thiobutyric acid, mercaptosuccinic acid and other aliphatic thiolcarboxylic acids, aromatic thiolcarboxylic acid having the structure shown below and oligomers of these compounds;

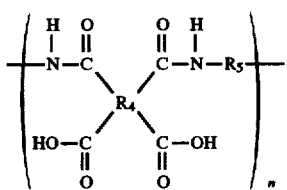

($X_7$ is a halogen atom or an alkyl group)

and further include lactic acid, glycolic acid, 3-hydroxybutyric acid, 4-hydroxybutyric acid, 3-hydroxyvaleric acid, 5-hydroxyvaleric acid, 6-hydroxycaproic acid, tartaric acid and other aliphatic hydroxycarboxylic acids; and aromatic hydroxycarboxylic acids having the structure shown below and oligomers of these compounds.

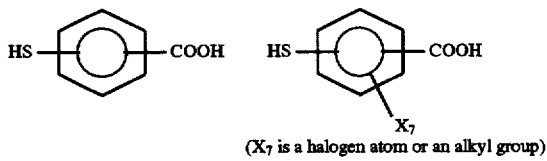

($X_8$ is a halogen atom or an alkyl group)

Polyamine compounds which are used for the preparation of polyamide, polyamic acid and/or polyimide in the process of the invention include, for example, ethylenediamine, propylenediamine, butylenediamine, hexamethylenediamine and other aliphatic diamines; cyclohexanediamine, norbornenediamine and other alicyclic diamines; and aromatic polyamines such as m-phenylenediamine, o-phenylenediamine, p-phenylenediamine, m-aminobenzylamine, p-aminobenzylamine, 4,4'-diaminodiphenyl ether, 3,3'-diaminodiphenyl ether, 3,4'-diaminodiphenyl ether, bis(3-aminophenyl)sulfide, bis(4-aminophenyl)sulfide, (3-aminophenyl)(4-aminophenyl) sulfide, bis(3-aminophenyl)sulfoxide, bis(4-aminophenyl) sulfoxide, (3-aminophenyl)(4-aminophenyl)sulfoxide, bis (3-aminophenyl)sulfone, bis(4-aminophenyl)sulfone, (3-aminophenyl)(4-aminophenyl)sulfone, 3,3'-diaminobenzophenone, 3,4'-diaminobenzophenone, 4,4'-diaminobenzophenone, 3,3'-diaminodiphenylmethane, 3,4'- diaminodiphenylmethane, 4,4'-diaminodiphenylmethane, bis[4-(3-aminophenoxy)phenyl]methane, bis[4-(4-aminophenoxy)phenyl]methane, 1,1-bis[4-(3-aminophenoxy)phenyl]ethane, 1,2-bis[4-(3-aminophenoxy)phenyl]ethane, 1,1-bis[4-(4-aminophenoxy)phenyl]ethane, 1,2-bis[4-(4-aminophenoxy)phenyl]ethane, 2,2-bis[4-(3-aminophenoxy)phenyl]propane, 2,2-bis[4-(4-aminophenoxy)phenyl]propane, 2,2-bis[4-(3-aminophenoxy)phenyl]butane, 2,2-bis[3-(3-aminophenoxy)phenyl]-1,1,1,3,3,3-hexafluoropropane, 2,2-bis[4-(3-aminophenoxy)phenyl]-1,1,1,3,3,3-hexafluoropropane, 2,2-bis[4-(4-aminophenoxy)phenyl]-1,1,1,3,3,3-hexafluoropropane, 1,3-bis(3-aminophenoxy)benzene, 1,3-bis(4-aminophenoxy)benzene, 1,4-bis(4-aminophenoxy)benzene, 1,4-bis(3-aminophenoxy)benzene, 4,4'-bis(3-aminophenoxy)biphenyl, 4,4'-bis(4-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]sulfide, bis[4-(3-aminophenoxy)phenyl]sulfoxide, bis[4-(4-aminophenoxy)phenyl]sulfoxide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 1,4-bis[4-(3-aminophenoxy)benzoyl]benzene, 1,3-bis[4-(3-aminophenoxy)benzoyl]benzene, 4,4'-bis[3-(4-aminophenoxy)benzoyl]diphenyl ether, 4,4'-bis[3-(3-aminophenoxy)benzoyl]diphenyl ether, bis[4-{4-(4-aminophenoxy)phenoxy}phenyl]sulfone, 1,4-bis[4-(4-aminophenoxy)phenoxy-α,α-dimethylbenzyl]benzene, 1,3-bis[4-(4-aminophenoxy)phenoxy-α,α-dimethylbenzyl]benzene, 4,4'-bis[4-(4-aminophenoxy)phenoxy-α,α-dimethylbenzyl]benzophenone, 3,3'-diaminobenzidine, 1,3,5-tri(3-aminophenoxy)benzene and 1,3,5-tri(4-aminophenoxy)benzene.

Next, preparation of polyimide is carried out by way of polyamic acid represented by the above general formula (5). Polyamic acid is prepared from tetracarboxylic dianhydride, that is, the compound obtained by dehydration ring-closure of the above stated four valent carboxylic acid. Tetracarboxylic dianhydride compounds which can be used include aromatic tetracarboxylic dianhydride represented by the structural formula below:

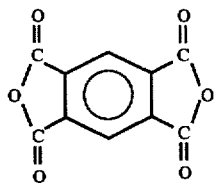

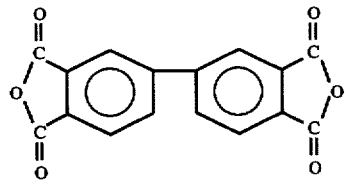

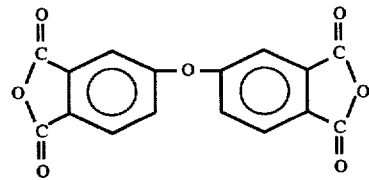

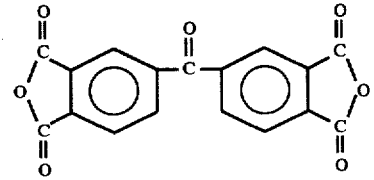

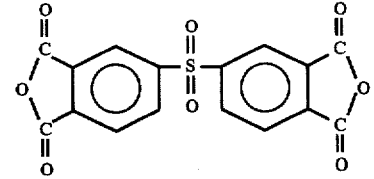

-continued
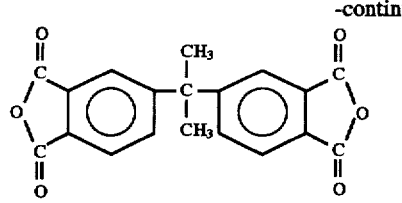
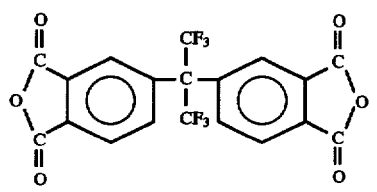
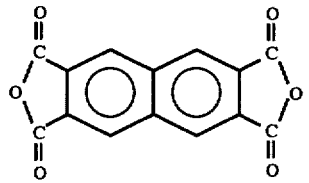
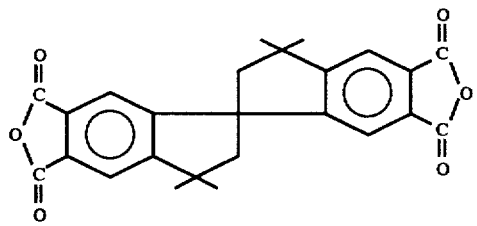
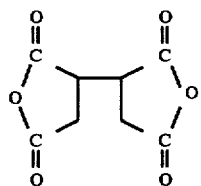
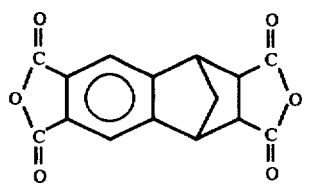
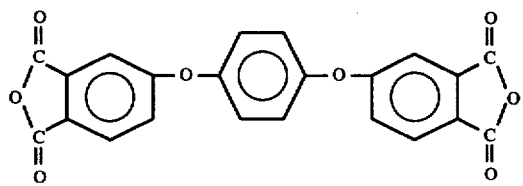
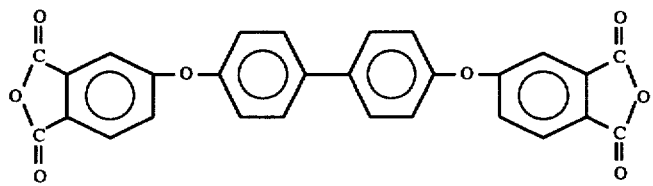

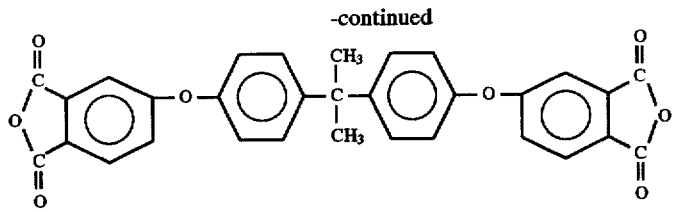

On preparation of polythioester and/or polyester in the invention, polyvalent thiol and/or polyhydric alcohol which can be used in combination with the above polycarboxylic acid include, for example, 1,2-ethanedithiol, 2,2'-oxydiethanethiol, 2,2'-thiodiethanethiol, 1,3-propanedithiol, 1,4-butanedithiol, 1,5-pentanedithiol, 1,6-hexanedithiol, 1,9-nonanedithiol, polytetramethylenedithiol, 1,2-benzenedimethanethiol, 1,3-benzenedimethanethiol, 1,4-benzenemethanethiol, 1,2,6-hexanetrithiol-trithioglycolate and other aliphatic polyvalent thiols and aromatic dithiols having the structure shown below:

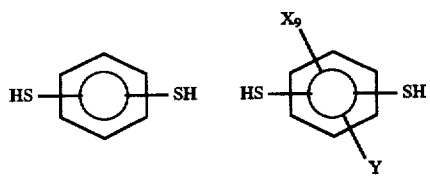

($X_9$ and Y are a halogen atom or an alkyl group)

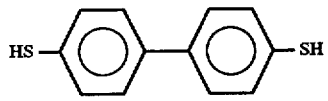

Polyhydric alcohols include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol, 1,4-benzenedimethanol, trimethylolpropane, trimethylolethane, trimethylolheptane, 1,2,4-butanetriol, 1,2,6-hexanetriol and other aliphatic polyhydric alcohols and aromatic dihydroxyl compounds having the structure shown below.

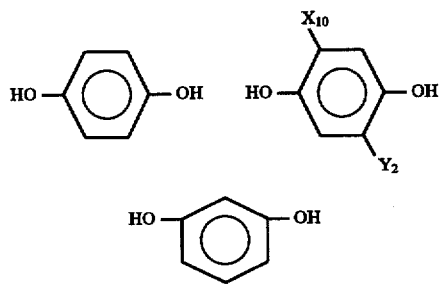

($X_{10}$ and $Y_2$ are a halogen atom or an alkyl group)

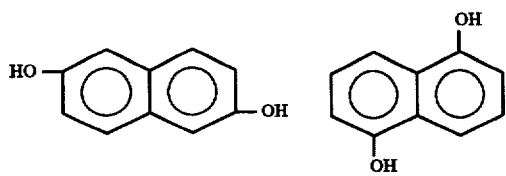

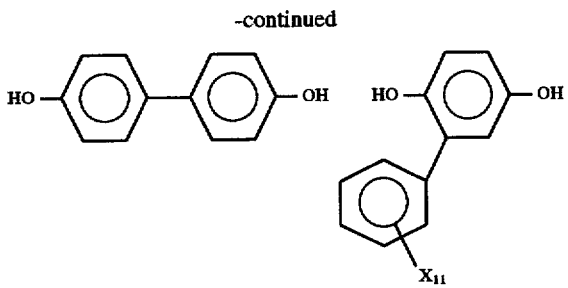

($X_{11}$ is a halogen atom or an alkyl group)

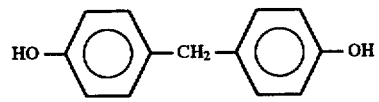

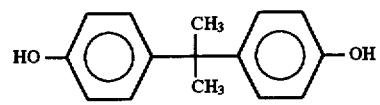

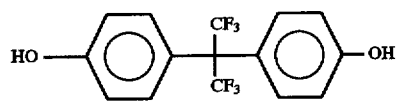

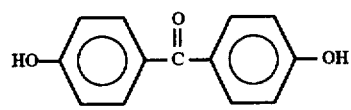

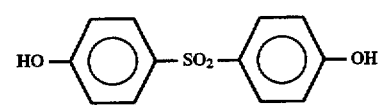

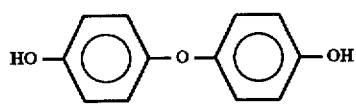

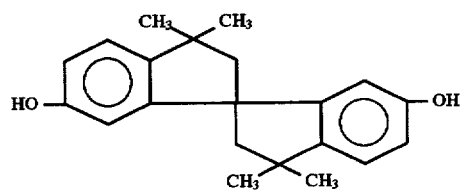

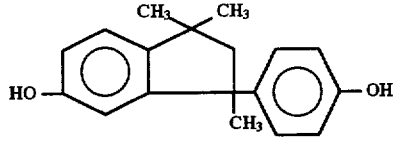

Further, a portion of thiol groups in polyvalent thiols can be replaced by hydroxyl groups. Such compounds include, for example, 2-mercaptoethanol, 1-mercapto-2-propanol, 3-mercapto-1-propanol, 3-mercapto-1,2-propanediol, 3-mercapto-2-butanol, 4-hydroxythiophenol and other aliphatic mercapto alcohols and mercapto phenols.

According to the process of the invention, polyester, polythioester, polyamide and polyimide of various molecular weights can be prepared from these compounds having a carboxyl group and compounds having active hydrogen groups.

According to the process of the invention, various types of copolymers can also be prepared. Exemplary copolymers which can be prepared include, for example, copolyamide, copolyimide, polyamideimide, copolythioester, copolyester, polyesterthioester, polyesteramide, polyesterimide, polythioesteramide, polythioesterimide, polyesteramideimide and polythioesteramideimide.

According to the process of the invention, polylactic acid, a representative biodegradable plastic, can be prepared with ease and within a short time. According to the preparation process of the invention, lactic acid and/or its oligomer are reacted with haloiminium salt to obtain acid chloride of lactic acid and/or its oligomer, and high molecular weight polylactic acid can be prepared by successive polycondensation of the acid chloride.

Haloiminium salt which can be used is a compound represented by the above formula (2), (3) or (4). In these haloiminium salts, preferred compounds in view of stability and supply are included in the formula (4) and are 2-chloro-1,3-dimethylimidazolinium chloride, 2-chloro-1,3-diethylimidazolinium chloride, 2-chloro-1,3-dipropylimidazolinium chloride and 2-chloro-1,3-dibutylimidazolinium chloride. These haloiminium salts can be used in combination. More preferred compounds, in particular, are 2-chloro-1,3-dimethylimidazolinium chloride and 2-chloro-1,3-dibutylimidazolinium chloride.

Lactic acid which can be used is L-lactic acid, D-lactic acid and a mixture thereof. Marketed lactic acid contains water and can be used as intact. However, in order to depress the amount of haloiminium salt, lactic acid is preferably pretreated. Pretreatment is dehydration by heating, azeotropic dehydration, or dehydration by use of a drying agent such as calcium chloride, magnesium sulfate, molecular sieves, mordenite, ion exchange resin and silica gel.

However, in order to obtain high molecular weight polylactic acid, lactic acid and/or oligomers of the same having 1,800 ppm by mol or less of monocarboxylic acids and/or alcohols as impurities for lactic acid unit are preferably used.

The amount of haloiminium salt is 0.85–6 mol, preferably equal mol or more, for mol of the carboxylic group in lactic acid and/or its oligomer to be reacted. When the amount of haloiminium salt is equal or more for mol of the carboxylic group, high molecular weight polylactic acid can be obtained with ease in the successive polymerization of acid halide.

That is, the reaction of lactic acid and/or its oligomer with chloroiminium salt can prepare acid chloride of lactic acid and/or its oligomer which is represented by the formula (1):

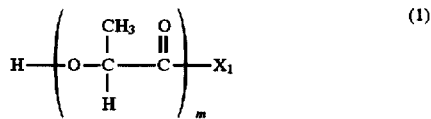

(1)

wherein $X_1$ is a halogen atom and m is an integer of 1 or more.

Preparation of polylactic acid by using chloroiminium salt as a haloiminium salt will be illustrated in detail hereinafter.

The temperature for reacting chloroiminium salt with lactic acid and/or its oligomers is usually 160° C. or less, preferably 40°–140° C. The temperature of 160° or less can inhibit formation of impurity represented by the formula (6):

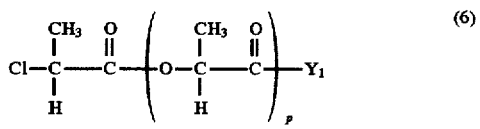

(6)

wherein p is an integer of 1 or more, and $Y_1$ is a chlorine atom or hydroxyl group. The impurity represented by the formula (6) acts as an end-capping agent in the successive polycondensation and affects the molecular weight of polylactic acid formed. Consequently, in order to obtain high molecular weight polylactic acid, it is preferable that the formation of the impurity represented by formula (6) is controlled by controlling the reaction conditions. And the amount of 2-chloropropionic acid which is obtained by hydrolyzing the obtained acid chloride of lactic acid and/or its oligomers is preferably 1,800 ppm by mol or less for a lactic acid unit.

After obtaining acid chloride of lactic acid and/or its oligomer, action of a base causes dehydrochlorination and can prepare polylactic acid.

Bases which can be used for dehydrochlorination include, for example, sodium hydroxide, sodium carbonate, sodium hydrogen carbonate, potassium hydroxide, potassium carbonate, potassium hydrogen carbonate, calcium hydroxide, calcium carbonate, and other inorganic bases; trimethylamine, triethylamine, tri-n-butylamine, N,N-dimethylcyclohexyl-amine, N,N-diethylcyclohexylamine, N,N-dimethylbenzylamine, N,N'-dimethylpiperazine, N,N-dimethylaniline, N,N-diethylaniline, N,N,N',N'-tetramethyl-1,3-propanediamine, pyridine, 2-methylpyridine, 3-methlypyridine, 4-methylpyridine, 4-ethylmorpholine, triethylenediamine, 1,3-diazabicyclo[5,4,0]undecene, N-ethylpiperidine and other organic bases and ion exchange resin having a pyridyl group or dimethylaminobenzyl group as an ion exchange group. Use of organic bases, in particular, leads to no hydrolysis on the terminal acid chloride group and a high molecular weight polymer can be preferably obtained.

The amount of bases used is equal mol or more, preferably 2–6 mols, more preferably 2–3 mols for mol of the terminal acid chloride. When the amount of the base is lower than equal mol, trapping of hydrogen chloride formed by the reaction becomes insufficient and the resultant polymer can not provide desired molecular weight in some cases. On the other hand, presence of the base in excess has no effect on the polymerization, but is unfavorable in economy, and additionally leads to problems of making successive purification and recovery complex.

When organic bases or ion exchange resins are used as the base, moisture in the base and/or the reaction system is preferably removed. Moisture in the reaction system hydrolyzes a terminal acid chloride group and forms a carboxylic acid group. The carboxylic acid group thus formed acts as an end-capping agent and lowers attainable molecular weight of polylactic acid. Therefore, the moisture content in the reaction system is preferably controlled as same as controlling the amount of the impurities which are contained in lactic acid of raw material.

When the base is used in polymerization, polymerization temperature is preferably 120° C. or less, more preferably 100° C. or less. Polymerization can also be carried out simply by heating in the absence of the base. In this case, the polymerization temperature is in the range of 120°–180° C. At temperature lower than the upper limit of these ranges, the impurity of the above formula (6) which acts as an end-capping agent is inhibited to form and thus lowering tendency of molecular weight can be depressed.

Further, polylactic acid can be prepared by reacting lactic acid and/or its oligomer with chloroiminium salt in the presence of the base. In this case, reaction temperature is 100° C. or less, the impurity of the above formula (6) is inhibited to form and thus reduction of attainable molecular weight can be prevented.

Consequently, the process of the invention can provide high molecular weight polylactic acid with ease. Further, according to the process of the invention, racemization of lactic acid in the preparation step can be depressed as compared with conventional technique. That is, the lactic acid units in polylactic acid has the same D/L ratio as the raw material lactic acid or its oligomer. As a result, polylactic acid having a desired D/L ratio can be prepared with good reproducibility by selecting the D/L ratio of lactic acid raw material.

Additionally, polylactic acid of the invention which has a D-isomer content of 1% or less can vary crystallinity of a molded item with the cooling condition in processing, and can arbitrarily control hue of the molded item from transparent to opaque products.

When hydroxycarboxylic acid other than lactic acid is used, desired polyhydroxycarboxylic acid can also be prepared by the above process.

Exemplarily hydroxycarboxylic acids other than lactic acid include glycolic acid, 2-hydroxybutanoic acid, 2-hydroxypentanoic acid, 2-hydroxyhexanoic acid, 2-hydroxyheptanoic acid, 2-hydroxyoctanoic acid, 2-hydroxy-2-methylpropanoic acid, 2-hydroxy-2-methylbutanoic acid, 2-hydroxy-2-ethylbutanoic acid, 2-hydroxy-2-methylpentanoic acid, 2-hydroxy-2-ethylpentanoic acid, 2-hydroxy-2-propylpentanoic acid, 2-hydroxy-2-butylpentanoic acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-hylactanoic acid, 2-hydroxy -2-propyloctanoic acid, 2-hydroxy-2-butyloctanoic acid, 2-hydroxy-2-pentyloctanoic acid, 2-hydroxy-2-hexyoctanoic acid, 2-hydroxy-2-heptyloctanoic acid, 5-hydroxy-5-propyloctanoic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, and 8-hydroxyoctanoic acid.

A copolymer of hydroxycarboxylic acid can also be prepared by reacting a mixture of hydroxycarboxylic acid or an oligomer of the mixture with haloiminium salt and successively carrying out polymerization. Similarly to the case of polylactic acid, polyhydroxycarboxylic acid obtained by the process of the invention can provide a polymer having a desired D/L ratio.

Further, aliphatic polyester can also be obtained by reacting haloiminium salt with aliphatic polyhydric alcohol and aliphatic polycarboxylic acid and/or an oligomer thereof. Aliphatic copolyester comprised of aliphatic polyhydric alcohol, aliphatic polycarboxylic acid and hydroxycarboxylic acid can also be similarly prepared.

Representative aliphatic polyhydric alcohols which can be used in the invention include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexandeiol, 1,9-nonanediol, neopentyl glycol, polytetramethylene glycol, 1,4-cyclohexanedimethanol, 1,4-benzenedimethanol, trimethylolpropane, trimethylolethane, trimethylolheptane, 1,2,4-butanetriol and 1,2,6-hexantriol. These aliphatic polyhydric alcohols can be used singly or as a mixture.

Aliphatic polycarboxylic acids which can be used include, for example, oxalic acid, malonic acid, succinic acid, glutaric acid, adipic acid, pimelic acid, suberic acid, azelaic acid, sebacic acid, undecanoic diacid, dodecanoic diacid and tricarballylic acid.

These polycarboxylic acids can be used singly or as a mixture.

EXAMPLE

The present invention will hereinafter be illustrated by way of examples. However, these examples are not intended to limit the scope of the invention.

Each analytical method will be illustrated below.
1) Determination of acyl chloride and carboxylic acid (neutralization titration method)

The sample obtained (Wg) was dissolved in dichloromethane/methanol=7/3 (volume ratio) in a nitrogen stream, and titrated with a sodium methoxide solution in methanol (Normality C). The first inflection point ($E_1$ ml) and the second inflection point ($E_2$ ml) were measured and the amounts of acyl chloride and carboxylic acid were calculated by the following equations.

Acyl chloride=$E_1 \times 10^{-3} \times C \times 72 \times 100/W$(mol %/lactic acid unit)

Carboxylic acid=$(E_2-E_1) \times 10^{-3} \times C \times 72 \times 100/W$(mol %/lactic acid unit)

2) Determination of acyl chloride (Silver nitrate titration method)

The sample obtained (Wg) was mixed with acetone/water=1/1 (weight ratio) and the resulting slurry was titrated (Titre V) with an aqueous silver nitrate solution (Normality C). The amount of acyl chloride was calculated by the following equation.

Acyl chloride=$V \times 10^{-3} \times C \times 72 \times 100 W$(mol %/lactic acid unit)

When 2-chloro-1,3-dimethylimidazolinium chloride (hereinafter referred to simply DMC) which was measured as below was remained, the amount of DMC was deduced.
3) Determination of 2-chloropropionic acid and impurity The sample (0.5 g) was hydrolyzed with a 18% aqueous sodium hydroxide solution (3 g). After finishing hydrolysis (solid was disappeared and the reaction mixture became transparent), the reaction mixture was neutralized with an aqueous 36% hydrogen chloride solution and determined by HPLC.

Column: Shodex KC810p+KC811×2 columns

Eluent: aqueous 4.8 mM-HClO$_4$ solution

4) Determination of DMC

DMC was determined by HPLC under following conditions.

Column: YMC-pack A-312×2 columns

Eluent: acetonitrile/water/tetrabutylammonium hydroxide=930/70/5 (volume ratio) (adjusted to pH2 by phosphoric acid)

Detector: UV 235 nm

5) Measurement of D/L isomer ratio in lactic acid, its oligomer and polymer

The sample was completely hydrolyzed with an aqueous 5N-NaOH solution, neutralized, and measured by HPLC under following conditions.

Column: Sumichiral OA-5000

Eluent: 1 mM-$CuSO_4$ water/isopropanol (98/2 by volume) solution

Detector: UV 254 nm

6) Measurement of inherent viscosity Inherent viscosity $\eta$ inh was calculated by the following equation.

$$\eta\,inh = \frac{\ln(t_1/t_0)}{C}$$

wherein $t_1$: falling time in measuring the solvent with an Ubbelohde viscosimeter $t_0$: falling time in measuring a solution which dissolves the sample C: concentration of sample (g/dl)

The solvent for use in the inherent viscosity measurement was arbitrarily selected from the solvents capable of dissolving the sample.

7) Measurement of a weight average molecular weight (MW)

Measured by GPC using polystyrene as a reference under the following conditions.

Apparatus: Shodex GPC system-11

Eluent: Chloroform

8) Measurement of a number average molecular weight (Mn)

$E_2$ which was obtained in the above neutralization titration method was used, and Mn was calculated by the following equation.

$$Mn = W/(E_2 \times 10^{-3} \times C)$$

wherein C: normality

9) Measurement of haze on the molded article

Direct reading type haze computer (Manufactured by Suga Tester Co.) was used. A test specimen having a thickness of 2 mm was used and measured in accordance with JIS K-7105.

10) Measurement of melt flow initiation temperature

The melt flow initiation temperature was measured with Shimadzu Koka type flow tester (CFT-500A) under 100 kgf load at 5° C./min.

11) Measurement of melt flow viscosity

The melt viscosity was measured with Shimadzu Koka type flow tester (CFT-500A) under 100 kgf load at 5° C./min.

12) Observation with polarized microscope

A very small piece of the polymer was observed in a nitrogen atmosphere under an orthogonal nicol of polarized microscope heating device: TH-600 (manufactured by Lincolm Co.).

13) Measurement of Tg, Tm and Tc

They are measured with DSC (DT-40 series, DSC-41M manufactured by Shimadzu).

14) Measurement of 5% weight loss temperature

It was measured with DTG (DT-40 series, DTG-40M manufactured by Shimadzu) by heating at a temperature rise rate of 10° C./min.

Example 1

To a reaction vessel equipped with a stirrer, reflux condenser, nitrogen inlet tube and thermometer, 14.61 (0.10 mol) of adipic acid, 33.64 g (0.20 mol) of 2-chloro-1,3-dimethylimidazolinium chloride (hereinafter referred to simply as DMC), and 105 g of 1,3-dimethylimidazolidinone (hereinafter referred to simply as DMi) were charged and heated with stirring at 120° C. for 2 hours. Successively, 11.62 g (0.10 mol) of hexamethylenediamine was added and further stirred for 5 hours. To the reaction mass, 4 g of pyridine was added, stirred for further an hour and cooled. The reaction mixture was poured into a large amount of acetone to precipitate polymer. After completely dried, the polymer was 21.33 g (94.3% yield). The polymer was dissolved at 180° C. in p-chlorophenol at a concentration of 0.5 g/dl. The solution had an inherent viscosity of 1.04 dl/g.

Example 2

To a reaction vessel similar to Example 1, 14.61 g (0.10 mol) of adipic acid, 33.64 g (0.20 mol) of DMC and 210 g of DMi were charged and heated with stirring at 120° C. for 2 hours. To the mixture, 26.24 g (0.20 mol) of 2-amino-n-caproic acid was added and reacted for further 4 hours. Successively, the reaction mass was cooled to 60° C. and 33.64 g (0.20 mol) of DMC was further added and heated with stirring at 120° C. for 2 hours. Thereafter 11.62 g (0.10 mol) of hexamethylenediamine was added and for further 5 hours. To the reaction mass, 8 g of pyridine was added and stirred for further an hour and cooled. Polymer was obtained from the reaction mixture thus obtained by carrying out the same procedures as Example 1. The yield was 91.7%. The polymer had an inherent viscosity of 0.88 dl/g, which was measured by the same method as Example 1.

Example 3

Polymer was obtained by carrying out the same procedures as described in Example 1 except that 14.61 g (0.1 mol) of adipic acid was replaced by 5.9 g (0.05 mol) of succinic acid and 7.31 g (0.05 mol) of adipic acid. The polymer had an inherent viscosity of 1.01 dl/g which was measured by the same procedures as Example 1.

Example 4

Polymer was obtained by carrying out the same procedures as described in Example 1 except that 11.62 g (0.10 mol) of hexamethylenediamine was replaced by 10.82 g (0.1 mol) of p-phenylenediamine. The polymer had an inherent viscosity of 0.72 dl/g which was measured by the same procedures as Example 1.

Example 5

To the same reaction vessel as Example 1, 16.61 g (0.10 mol) of terephthalic acid, 33.64 g (0.20 mol) of DMC and 110 g of DMi were charged and heated with stirring at 150° C. for 2 hours. Successively, 10.82 g (0.10 mol) of p-phenylenediamine was added and heated with stirring at 180° C. for 5 hours. After cooling the reaction mass to 100° C., about 4 g of pyridine was added and further cooled to room temperature. The reaction mass was poured into a large amount of acetone and wet ground with a homogenizer to precipitate polymer. The polymer was filtered, washed and dried to obtain pale white polymer.

The white polymer was dissolved in 98% concentrated sulfuric acid at a concentration of 0.5 g/dl and inherent viscosity was measured. The inherent viscosity was 1.45 dl/g.

Example 6

To the same reaction vessel as used in Example 1, 16.61 g (0.10 mol) of isophthalic acid and 33.64 g (0.20 mol) of DMC were charged and heated with stirring at 150° C. for 2 hours. To the solution obtained, 27.43 g (0.20 mol) of m-aminobenzoic acid was added and heated with stirring at 180° C. for further 4 hours. After cooling the reaction mass to 100° C., 33.64 (0.20 mol) of DMC was added and heated with stirring at 180° C. for 4 hours. Further, the reaction mass was cooled to 100° C., 10.82 g (0.10 mol) of m-phenylenediamine was added, and the reaction was continued at 180° C. for 5 hours. After cooling the reaction mass to 100° C., 8 g of pyridine was added and further cooled to room temperature. Precipitation and separation of the polymer were carried out by the same procedures as Example 5 to obtain pale white polymer. The polymer had an inherent viscosity of 1.09 dl/g at a concentration of 0.5 g/dl in 98% concentrated sulfuric acid.

Example 7

Polymer was obtained by carrying out the same procedures as described in Example 4 except that 14.61 g (0.10 mol) of adipic acid was replaced by 5.90 g (0.05 mol) of succinic acid and 7.31 g (0.05 mol) of adipic acid. The polymer had an inherent viscosity of 0.82 dl/g which was measured by the same procedures as Example 1.

Example 8

Polymer was obtained by carrying out the same procedures as described in Example 5 except that 16.61 g (0.10 mol) of terephthalic acid was replaced by 8.31 g (0.05 mol) of terephthalic acid and 8.31 g (0.05 mol) of isophthalic acid, and 10.82 g (0.10 mol) of p-phenylenediamine was replaced by 5.41 g (0.05 mol) of p-phenylenediamine and 5.41 g (0.05 mol) of m-phenylenediamine.

The polymer had an inherent viscosity of 1.42 dl/g in 98% sulfuric acid which was measured by the same procedures as Example 5.

Example 9

To a reaction vessel equipped with a stirrer, reflux condenser, nitrogen inlet tube and thermometer, 18.42 g (0.05 mol) of bis(3-aminophenoxy)biphenyl, 10.36 g (0.0457 mol) of pyromellitic dianhydride, 0.74 g (0.005 mol) of phthalic anhydride and 115 g of DMi were charged and reacted in nitrogen atmosphere at 60° C. for about 4 hours to obtain a polyamic acid DMi solution.

To the solution, 16.91 g (0.10 mol) of DMC was added and heated with stirring at 90° for 6 hours and at 150° for 2 hours. After finishing the reaction, the reaction mass was cooled to room temperature, a large amount of toluene was charged and the mixture was filtered, washed and dried to obtain 25.67 g (92.6% yield) of light yellow polymer.

Polyimide thus obtained had an inherent viscosity of 0.43 dl/g at 35° C. at a concentration of 0.5 g/dl in a solvent mixture of p-chlorophenol/phenol (9/1 by weight). The polyimide had a glass transition temperature of 243° C., melting point of 384° C., and crystallization temperature of 317° C. The polyimide was substantially crystalline polymer. The melt flow initiation temperature of the polyimide was measured with a Shimadzu Koka type flow tester: CFT-500 under 100 kgf load. The flow initiation temperature was 390° and melt viscosity at 420° C./5 min. was 3740 poise.

Example 10

Orange yellow polymer was obtained by carrying out the same procedures as described in Example 9 except that 18.42 g (0.05 mol) of bis(3-aminophenyl)biphenyl was replaced by 10.01 g (0.05 mol) of 4,4'-diaminodiphenyl ether. The polyimide was insoluble in various organic solvents and acid such as sulfuric acid. Glass transition temperature was not observed by DSC.

Example 11

Light yellow polymer was obtained by carrying out the same procedures as described in Example 9 except that 10.36 g (0.0475 mol) of pyromellitic dianhydride was replaced by 5.18 g (0.0238 mol) of pyromellitic dianhydride and 7.00 g (0.0238 mol) of 3,3',4,4'-biphenyltetracarboxylic dianhydride. The polyimide thus obtained had an inherent viscosity of 0.44 dl/g and a glass transition temperature of 235° C.

Example 12

Polymer was obtained by carrying out the same procedures as described in Example 9 except that 18.42 g (0.05 mol) of bis(3-aminophenoxy)biphenyl was replaced by 15.43 g (0.10 mol) of norbornanediaminomethyl, that 10.36 g (0.0475 mol) of pyromellitic dianhydride was replaced by 19.81 g (0.10 mol) of butanetetracarboxylic dianhydride, and that phthalic anhydride was not used. The polymer had an inherent viscosity of 0.86 dl/g which was measured by the same method as Example 9.

Example 13

Polymer was obtained by carrying out the same procedures as described in Example 12 except that 15.43 g (0.10 mol) of norbornanediaminomethyl was replaced by 7.71 g (0.05 mol) of norbornanediaminomethyl and 5.81 g (0.05 mol) of hexamethylenediamine.

The polymer had an inherent viscosity of 1.02 dl/g by the same method as Example 12.

Example 14

To the same reaction vessel as used in Example 9, 19.97 g (0.05 mol) of 1,3,5-tri(3-aminophenoxy)benzene and 24.17 g (0.075 mol) of 3,3',4,4'-benzophenonetetracarboxylic dianhydride were charged, and reaction was carried out by the same procedures as described in Example 9. The reaction mixture was poured into a large amount of methyl ethyl ketone. The polymer was precipitated with high speed stirring. The polymer obtained was tried to dissolve in various organic solvents. However, the polymer formed gel like substance and did not dissolve in solvents.

Example 15

In the same reaction vessel as used in Example 1, 13.31 g (0.10 mol) of aspartic acid and 17.29 g (0.10 mol) of DMC were dissolved in 20 g of DMi and reacted at room temperature for about 8 hours. To the reaction solution obtained, 15.8 g of pyridine was added and reacted at 160° C. for 7 hours. The reaction mass obtained was poured into a large amount of methanol. The precipitated polymer was filtered, washed and dried to obtain white polymer. The polymer had an inherent viscosity of 0.58 dl/g by the same method as Example 1. IR analysis confirmed that the polymer was polysuccinimide.

Example 16

15.42 g (0.10 mol) of thiosalicylic acid, 10.61 g (0.10 mol) of 2-mercaptopropionic acid (thiolactic acid), 27 g (0.16 mol) of DMC and 120 g of xylene were mixed and heated under reflux for 2 hours. Successively, the reaction mass was cooled to 60° C. and 8.5 g (0.05 mol) of DMC was added and further stirred for 5 hours. To the reaction mass, 32 g of pyridine was added and cooled to room temperature. The reaction mass was poured into a large amount of isopropyl alcohol and wet ground with a homogenizer. The precipitated polymer was filtered, washed with isopropyl alcohol and dried to obtain 22.3 g (92.1% yield) of polymer.

The polymer obtained had an inherent viscosity of 0.85 dl/g at 35° C. at a concentration of 0.5 g/dl in p-chlorophenol.

The melt flow initiation temperature of the polymer was measured with a Shimadzu Koka type flow tester: CFT-500A under 100 kgf load. Melt flow was observed to initiate around 200° C. The strand obtained was tough and very flexible.

Example 17

3.08 g (0.02 mol) of thiosalicylic acid, 2.50 g (0.01 mol) of 4,4'-thiobisbenzenethiol, 1.66 g (0.01 mol) of terephthalic acid, 7.4 g (0.044 mol) of DMC and 30 g of o-dichlorobenzene were mixed and heated with stirring at 110° C. for an hour. Successively, 7 g of pyridine was added, and the mixture was further stirred for an hour and cooled. The reaction mass obtained was poured into a large amount of isopropyl alcohol and wet ground with a homogenizer. The precipitated polymer was filtered, repeatedly washed with isopropyl alcohol and dried.

The polymer obtained had an inherent viscosity of 0.69 dl/g at 60° C. at a concentration of 0.5 g/dl in pentafluorophenol.

Example 18

4.63 (0.03 mol) of thiosalicylic acid, 1.70 g (0.01 mol) of 1,4-benzenedimethanethiol, 1.66 g (0.01 mol) of terephthalic acid, 9.3 g (0.055 mol) of DMC and 30 g of o-dichlorobenzene were mixed and heated with stirring at 110° C. for about an hour. Successively, 8.7 g of pyridine was added and further stirred for an hour. After cooling, the reaction mass was poured into a large amount of isopropyl alcohol and wet ground with a homogenizer. The precipitated polymer was filtered, repeatedly washed with isopropyl alcohol and dried.

The polymer obtained had an inherent viscosity of 1.3 dl/g at 60° C. at a concentration of 0.5 g/dl in pentafluorophenol.

Example 19

16.61 g (0.10 mol) of terephthalic acid, 9.42 g (0.10 mol) of 1,2-ethanedithiol, 23.13 g (0.15 mol) of thiosalicylic acid, 60 g (0.355 mol) of DMC, 260 g of chloroform and 57 g of pyridine were mixed and stirred at room temperature for about 5 hours. The reaction mass was poured into a large amount of isopropyl alcohol and wet ground with a homogenizer. The precipitated polymer was filtered, washed with isopropyl alcohol and dried.

The polymer thus obtained had an inherent viscosity of 0.93 dl/g at 60° C. at a concentration of 0.5 g/dl in pentafluorophenol.

Example 20

3.32 g (0.02 mol) of terephthalic acid, 5.01 g (0.02 mol) of 4,4'-thiobisbenzenethiol, 7.44 g (0.044 mol) of DMC and 75 ml of ethylene dichloride were mixed and stirred at 70° C. for 3 hours. To the reaction mass, 7 g of pyridine was added and stirred for further an hour. The reaction mass was cooled, poured into a large amount of acetone. The polymer was filtered and repeatedly washed with water and acetone. The yield of the polymer after drying was 96%. The polymer had an inherent viscosity of 1.3 dl/g at 35° C. at a concentration of 0.5 g/dl in a solvent mixture of tetrachloroethanephenol (40/60 by weight).

Example 21

Polymer was obtained by carrying out the same procedures as described in Example 20 except that 3.32 g (0.02 mol) of terephthalic acid and 7.44 g (0.044 mol) of DMC were replaced by 3.32 g (0.02 mol) of isophthalic acid and 11.2 g (0.044 mol) of 2-chloro-1,3-dibutyl -imidazolinium chloride, respectively. The polymer obtained had an inherent viscosity of 1.1 dl/g at 35° C. at a concentration of 0.5 g/dl in a solvent mixture of tetrachloroethane/phenol (40/60 by weight).

Example 22

Polymer was obtained by carrying out the same procedures as described in Example 20 except that 3.32 g (0.02 mol) of terephthalic acid and 7 g of pyridine were replaced by 1.66 (0.01 mol) of terephthalic acid, 1.66 g (0.01 mol) of isophthalic acid and 9 g of triethylamine, respectively. The polymer obtained had an inherent viscosity of 1.2 d/lg at 35° C. at a concentration of 0.5 g/dl in a solvent mixture of tetrachloroethanephenol (40/60 by weight).

Example 23

Polymer was obtained by carrying out the same procedures as described in Example 20 except that 5.01 g (0.02 mol) of 4,4'-thiobisbenzenethiol was replaced by 2.84 g (0.02 mol) of 1,3-benzenedithiol. The polymer obtained had an inherent viscosity of 0.92 dl/g at 60° C. at a concentration of 0.1 g/dl in pentafluorophenol.

Example 24

Polymer was obtained by carrying out the same procedures as described in Example 20 except that 3.32 g (0.02 mol) of terephthalic acid was replaced by 1.16 (0.01 mol) of maleic acid and 1.66 g (0.01 mol) of terephthalic acid.

The polymer obtained had an inherent viscosity of 0.6 dl/g at 35° C. at a concentration of 0.5 g/dl in a solvent mixture of tetrachloroethane/phenol (40/60 by weight).

Example 25

3.32 g (0.02 mol) of terephthalic acid, 1.88 (0.02 mol) of 1,2-ethanedithiol, 7.44 g (0.044 mol) of DMC, 20 ml of ethylene dichloride and 7 g of pyridine were mixed and stirred at room temperature for 4 hours. The reaction mass was poured into a large amount of isopropyl alcohol. Precipitated polymer was filtered, washed with isopropyl alcohol and dried.

The polymer obtained had an inherent viscosity of 0.82 dl/g at 35° C. at a concentration of 0.5 g/dl in a solvent mixture of tetrachloroethane/phenol (40/60 by weight).

Example 26

Polymer was obtained by carrying out the same procedures as described in Example 25 except that 3.32 g (0.02 mol) of terephthalic acid and 1.88 g (0.02 mol) of 1,2-ethanedithiol were replaced by 2.92 g (0.02 mol) of adipic acid and 2.84 g (0.02 mol) 1,3-benzenethiol, respectively.

The polymer obtained had an inherent viscosity of 0.95 dl/g at 35° C. at a concentration of 0.5 g/dl in a solvent mixture of tetrachloroethane/phenol (40/60 by weight).

Example 27

21.2 g (0.2 mol) of 2-mercaptopropionic acid (thiolactic acid), 27 g (0.16 mol) of DMC, and 120 g of xylene were mixed and heated under reflux for 2 hours. Successively, the reaction mass was cooled to 60° C. 8.5 g (0.05 mol) of DMC was added, and the reaction was continued with stirring for 5 hours. To the reaction mass, 32 g of pyridine was added and cooled to room temperature. The reaction mass was poured into a large amount of isopropyl alcohol and wet ground with a homogenizer. The precipitated polymer was filtered, sufficiently washed with isopropyl alcohol and dried.

Polymer obtained was 16.2 g (92.0% yield).

The polymer had an inherent viscosity of 1.05 dl/g at 35° C. at a concentration of 0.5 g/dl in p-chlorophenol.

Example 28

Polymer was obtained by carrying out the same procedures as described in Example 27 except that 21.22 g (0.20 mol) of 2-mercaptopropionic acid was replaced by 9.21 g (0.10 mol) of mercaptoacetic acid (thioglycolic acid) and 10.61 g (0.10 mol) of 2-mercaptopropionic acid.

The polymer obtained had an inherent viscosity of 0.95 dl/g by the same method as Example 27.

Example 29

20.20 g (0.10 mol) of sebacic acid, 50.7 g of DMC and 150 g of ethylene dichloride were mixed and heated in nitrogen atmosphere at 80° C. for an hour. To the mixture, 9.42 g (0.10 mol) of 1,2-ethanedithiol and 158 g of pyridine were added and reacted at 80° C. for an hour. Polymer was obtained by successively carrying out the same procedure as Example 27. The polymer had an inherent viscosity of 1.25 dl/g by the same method as Example 27.

Example 30

Polymer was obtained by carrying out the same procedures as described in Example 29 except that 20.20 g (0.10 mol) of sabacic acid was replaced by 5.90 g (0.05 mol) of succinic acid and 7.31 g (0.05 mol) of adipic acid. The polymer obtained had an inherent viscosity of 1.03 dl/g by the same method as Example 29.

Example 31

Polymer was obtained by carrying out the same procedures as described in Example 29 except that 9.42 g (0.10 mol) of 1,2-ethanedithiol was replaced by 4.71 g (0.05 mol) of 1,2-ethanedithiol and 5.41 g (0.05 mol) of 1,3-propanedithiol.

The polymer obtained had an inherent viscosity of 0.86 dl/g by the same method as Example 29.

Example 32

To a reaction vessel equipped with a stirrer, reflux condenser, nitrogen inlet tube and thermometer, 21.01 g (0.10 mol) of 1,3,5-benzenetricarboxylic acid, 55.79 g (0.33 mol) of DMC, 21.34 g (0.15 mol) of 1,3-benzenethiol and 130 g of o-dichlorobenzene were charged and stirred at 130° C. for 4 hours. Successively the reaction mass was cooled to 60° C. and 48 g of pyridine was added and stirred at room temperature for 5 hours. The reaction mixture was poured into a large amount of isopropyl alcohol and stirred at high rotation with a homogenizer. The precipitated polymer was filtered, washed and dried to obtain white polymer. The polymer was insoluble in organic solvents and measurement of inherent viscosity was impossible.

Example 33

13.81 g (0.10 mol) of 4-hydroxybenzoic acid, 18.82 g (0.10 mol) of 6-hydroxy-2-naphthoic acid, 27 g (0.16 mol) of DMC and 130 g of xylene were mixed and heated under reflux for 2 hours. Successively, the reaction mass was cooled to 60° C., 8.5 g (0.05 mol) of DMC was added, and stirring was further continued for 5 hours. To the reaction mass, 32 g of pyridine was added and cooled to room temperature. The reaction mass was poured into a large amount of isopropyl alcohol and wet ground with a homogenizer. The precipitated polymer was filtered, washed with isopropyl alcohol and dried to obtain 27 g of polymer (93% yield).

The polymer obtained did not dissolve at all in p-chlorophenol at 180° C.

Thermal properties of the polymer were measured with DSC (Shimadzu DT-40 series, DSC-41M) and DTG (Shimadzu DT-40 series, DTG-40M).

Differential thermal behavior of the polymer was observed with DSC by heating at a temperature rise rate of 16° C./min in a nitrogen stream.

As a result, a heat absorption peak was shown at 250° C. and 281° C.

A 5% weight loss temperature was measured with DTG by heating at a temperature rise rate of 10° C./min. The 5% weight loss temperature was 483° C.

Further, melt viscosity of the polymer was measured with a Shimadzu Koka flow tester: CFT-500A under 100 kgf load. The melt viscosity was 9500 poise at 270° C. and 1500° C. poise at 280° C. Any strands obtained were tough.

Example 34

2.76 g (0.02 mol) of 4-hydroxybenzoic acid, 1.86 g (0.01 mol) of 4,4'-dihydroxybiphenyl, 1.66 g (0.01 mol) of terephthalic acid, 7.4 g (0.044 mol) of DMC and 25 g of o-dichlorobenzene were mixed and heated with stirring at 110° C. for about an hour. Successively, 7 g of pyridine was added and further stirred for an hour. After cooling, the reaction mass was poured into a large amount of isopropyl alcohol and wet ground with a homogenizer. The precipitated polymer was filtered, repeatedly washed with isopropyl alcohol, and dried. The polymer obtained had an inherent viscosity of 0.60 d/lg at 60° C. at a concentration of 0.1 g/dl in pentafluorophenol.

Example 35

4.41 g (0.03 mol) of 4-hydroxybenzoic acid, 2.02 g (0.01 mol) of 4,4'-dihydroxydiphenyl ether, 1.66 g (0.01 mol) of terephthalic acid, 9.3 g (0.055 mol) of DMC and 30 g of o-dichlorobenzene were mixed and heated with stirring at 110° C. for an hour. Successively, 8.7 g of pyridine was added and the stirring was further continued for an hour. After cooling, the reaction mass obtained was poured into a large amount of isopropyl alcohol and wet ground with a homogenizer. The polymer was filtered, repeatedly washed with isopropyl alcohol, and dried. The polymer obtained had an inherent viscosity of 1.8 dl/g at 60° C. at a concentration of 0.1 g/dl in pentafluorophenol.

A very small piece of the polymer was observed in a nitrogen atmosphere at the rate of 10° C./min under an orthogonal nicol of polarized microscope heating device: TH-600 (manufactured by Lincolm Co.). As a result, light initiated to transmit at 284° C. and amount of the transmitted light further increased at around 307° C. Thus it was confirmed that the polymer formed an optically anisotropic molten phase.

Example 36

16.61 g (0.10 mol) of terephthalic acid, 6.21 g (0.10 mol) of ethylene glycol, 20.72 g (0.15 mol) of 4-hydroxybenzoic acid, 60 g (0.355 mol) of DMC, 250 g of chloroform and 57 g of pyridine were mixed and stirred at room temperature for 5 hours. The reaction mass was poured into a large amount of isopropyl alcohol and wet ground with a homogenizer. The precipitated polymer was filtered, washed with isopropyl alcohol and dried. The polymer thus obtained had an inherent viscosity of 1.6 d/lg at 60° C. at a concentration of 0.1 g/dl in pentafluorophenol.

Example 37

3.32 g (0.02 mol) of terephthalic acid, 4.57 g (0.02 mol) of bisphenol A, 7.44 g (0.044 mol) of DMC and 75 ml of ethylene dichloride were mixed and stirred at 70° C. for 3 hours. To the reaction mass, 7 g of pyridine was added and stirring was further continued for an hour. After cooling, the reaction mass was poured into a large amount of acetone. The precipitated polymer was filtered and repeatedly washed with water and acetone. After drying, the yield of the polymer was 96%. The polymer had an inherent viscosity of 1.2 dl/g at 35° C. at a concentration of 0.5 g/dl in a solvent mixture tetrachloroethanephenol (40/60 by weight).

Example 38

Polymer was obtained by carrying out the same procedures as described in Example 37 except that 3.32 g (0.02 mol) of terephthalic acid and 7.44 g (0.044 mol) of DMC were replaced by 3.32 g (0.02 mol) of isophthalic acid and 11.2 g (0.044 mol) of 2-chloro-1,3-dibutylimidazolinium chloride respectively. The polymer obtained had an inherent viscosity of 1.5 d/lg at 35° C. at a concentration of 0.5 g/dl in a solvent mixture tetrachloroethanephenol (40/60 by weight).

Example 39

Polymer was obtained by carrying out the same procedures as described in Example 37 except that 3.32 g (0.02 mol) of terephthalic acid and 7 g of pyridine were replaced by 1.66 g (0.01 mol) of terephthalic acid and 1.66 g (0.01 mol) of isophthalic acid and 9 g of triethylamine, respectively.

The polymer obtained had an inherent viscosity of 0.9 d/lg at 35° C. at a concentration of 0.5 g/dl in a solvent mixture tetrachloroethane/phenol (40/60 by weight).

Example 40

Polymer was obtained by carrying out the same procedures as described in Example 37 except that 4.57 g (0.02 mol) of bisphenol A was replaced by 3.72 g (0.02 mol) of 2,5-dihydroxybiphenyl. The polymer obtained had an inherent viscosity of 0.65 dl/g at 60° C. at a concentration of 0.1 g/dl in pentafluorophenol.

Example 41

Polymer was obtained by carrying out the same procedures as described in Example 37 except that 3.32 g (0.02 mol) of terephthalic acid was replaced by 1.16 g (0.01 mol) of maleic acid and 1.66 g (0.01 mol) of terephthalic acid. The polymer obtained had an inherent viscosity of 0.7 dl/g at 35° C. at a concentration of 0.5 g/dl in a solvent mixture tetrachloroethanephenol (40/60 by weight).

Example 42

3.32 g (0.02 mol) of terephthalic acid, 1.24 g (0.02 mol) of ethylene glycol, 7.44 g (0.044 mol) of DMC, 20 ml of ethylene dichloride and 7 g of pyridine were mixed and stirred at room temperature for 4 hours. The reaction mass was poured into a a large amount of isopropyl alcohol. The precipitated polymer was filtered, washed with isopropyl alcohol and dried. The polymer obtained was 3.7 g (96% yield) and had an inherent viscosity of 0.95 dl/g at 35° C. at a concentration of 0.5 g/dl in a solvent mixture tetrachloroethanephenol (40/60 by weight).

Example 43

Polymer was obtained by carrying out the same procedures as described in Example 42 except that 3.32 g (0.02 mol) of terephthalic acid and 1.24 g (0.02 mol) of ethylene glycol were replaced by 2.92 g (0.02 mol) of adipic acid and 2.20 g (0.02 mol) of hydroquinone, respectively. The polymer obtained had an inherent viscosity of 1.1 dl/g at 35° C. at a concentration of 0.5 g/dl in a solvent mixture tetrachloroethane/phenol (40/60 by weight).

Example 44

To a reaction vessel equipped with a stirrer, reflux condenser, nitrogen inlet tube and thermometer, 30.02 g (0.20 mol) of L-tartaric acid, 74.38 g (0.44 mol) of DMC, and 90 g of xylene were charged and refluxed with stirring for 2 hours. Successively, the reaction mass was cooled to 60° C. and 18.60 g (0.11 mol) of DMC was added and heated with stirring for 5 hours under refluxing of xylene. To the reaction mass, 64 g of pyridine was added and cooled to room temperature. The reaction mass was poured into a large amount of isopropyl alcohol and stirred with a homogenizer at high rotation. The precipitated polymer was filtered, washed and dried. White polymer thus obtained was 20.95 g (91.8% yield). The polymer formed gel like material when intended to dissolve in various organic solvents. Thus measurement of the inherent viscosity was impossible.

Example 45

To a reaction vessel equipped with a stirrer, reflux condenser, nitrogen inlet tube and thermometer, 14.61 g (0.10 mol) of adipic acid, 33. 81 g (0.20 mol) of DMC and 105 g of o-dichlorobenzene were charged and reacted at 110° C. for 2 hours. Successively, the reaction mass was cooled to 60° C., 7.50 g (0.05 mol) of tartaric acid was added, and the reaction was further continued at 110° C. for 4 hours. To the reaction mass, 18.60 g (0.11 mol) of DMC was added and reacted at 110° C. for 2 hours. Thereafter 12.41 g (0.20 mol) of ethylene glycol was added and stirred for 5 hours. The reaction mixture thus obtained was poured into a large amount of isopropyl alcohol and stirred with a homogenizer at high rotation. The precipitated polymer was filtered, washed and dried to obtain white polymer. The polymer formed gel like material when intended to dissolve in various organic solvents. Thus, it is impossible to measure inherent viscosity.

Example 46

To a reaction vessel equipped with a stirrer, reflux condenser, nitrogen inlet tube and thermometer, 32.83 g (0.20 mol) of 4-hydroxycinnamic acid, 27.05 g (0.16 mol) of DMC, and 100 g of xylene were charged and stirred under reflux of xylene for 2 hours. The reaction mass was cooled to 60° C. and 8.45 g (0.05 mol) of DMC was added and stirring was continued under reflux of xylene for 5 hours. Thereafter, 32 g of pyridine was added to the reaction mass and cooled to room temperature. The solution thus obtained was poured into a large amount of isopropyl alcohol and stirred with a homogenizer at high rotation. The precipitated polymer was filtered, washed and dried to obtain white polymer. The polymer had an inherent viscosity of 0.86 dl/g at 35° C. at a concentration of 0.5 g/dl in p-chlorophenol.

Example 47

To a reaction vessel equipped with a stirrer, reflux condenser, nitrogen inlet tube and thermometer, 16.42 g (0.10 mol) of 4-hydroxycinnamic acid, 13.81 g (0.10 mol) of 4-hydroxybenzoic acid, 27.05 g (0.16 mol) of DMC, and 100 g of xylene were charged and stirred under reflux of xylene for 2 hours. The reaction mass was cooled to 60° C. and 8.45 g (0.05 mol) of DMC was added and stirring was continued under reflux of xylene for 5 hours. Thereafter, 32 g of pyridine was added to the reaction mass and cooled to room temperature. The solution thus obtained was poured into a large amount of isopropyl alcohol and stirred with a homogenizer at high rotation. The precipitated polymer was filtered, washed and dried to obtain white polymer. The polymer had an inherent viscosity of 1.06 dl/g at 35° C. at a concentration of 0.5 g/dl in p-chlorophenol.

Example 48

To a reaction vessel equipped with a stirrer, reflux condenser, nitrogen inlet tube and thermometer, 21.01 g (0.10 mol) of 1,3,5-benzenetricarboxylic acid, 55.79 g (0.33 mol) of DMC, 16.52 g (0.15 mol) of hydroquinone and 115 g of o-dichlorobenzene were charged and stirred at 130° C. for 4 hours. Successively, the reaction mass was cooled to 60° C., 48 g of pyridine was added and stirred at room temperature for 5 hours. The reaction mixture was poured into a large amount of isopropyl alcohol and stirred with a homogenizer at high rotation. The precipitated polymer was filtered, washed and dried to obtain white polymer. The white polymer formed gel like material on intending to dissolve in various organic solvents. Thus, it was impossible to measure inherent viscosity of the polymer.

Example 49

To the same reaction vessel as used in Example 9, 19.21 g (0.10 mol) of trimellitic anhydride, 18.42 g (0.05 mol) of bis(3-aminophenoxy)biphenyl, and 130 g of DMi were charged and stirred at room temperature for 4 hours. To the solution, 33.81 g (0.20 mol) of DMC was added and reacted at 90° C. for 4 hours. Further, 18.42 g (0.05 mol) of bis(3-aminophenoxy)biphenyl was added and reacted at 90° C. for 6 hours and at 150° C. for 2 hours. The reaction mixture was subjected to the same procedures as Example 9 to obtain polymer. The polymer, had an inherent viscosity of 0.82 dl/g by the same method as Example 9.

Example 50

Polymer was obtained by carrying out the same procedures as described in Example 49 except that bis(3-aminophenoxy)biphenyl was replaced by the same equivalent of bis(4-aminophenyl)methane. The polymer obtained had an inherent viscosity of 1.12 dl/g by the same method as Example 49.

Example 51

Polymer was obtained by carrying out the same procedures as described in Example 25 except that 1.88 g (0.02 mol) of 1,2-ethandithiol was replaced by 1.56 g (0.02 mol) of 2-meraptoethanol. The polymer obtained had an inherent viscosity of 0.74 dl/g at 35° C. at a concentration of 0.5 g/dl in a solvent mixture tetrachloroethan/phenol (40/60 by weight).

Example 52

Polymer was obtained by carrying out the same procedures as described in Example 25 except that 1.88 g (0.02 mol) of 1,2-ethandithiol was replaced by 2.52 g (0.02 mol) of 4-hydroxythiophenol. The polymer obtained had an inherent viscosity of 0.66 dl/g at 35° C. at a concentration of 0.5 g/dl in a solvent mixture tetrachloroethan/phenol (40/60 by weight).

Example 53

To a reaction vessel equipped with a stirrer, reflux condenser, nitrogen inlet tube and thermometer, 14.61 g (0.10 mol) of adipic acid, 16.91 g (0.20 mol) of DMC and 100 g of xylene were charged and stirred under reflux of xylene for 2 hours. After cooling to 60° C., 4.71 g (0.05 mol) of 1,2-ethanedithiol, 5.81 g (0.05 mol) of hexamethylenediamine and 18 g of pyridine were added and stirred again under reflux of xylene for 5 hours. After finishing the reaction, the reaction mass was cooled to room temperature and poured into a large amount of isopropyl alcohol and stirred with a homogenizer at high rotation. The precipitated polymer was filtered, washed and dried to obtain white polymer. The polymer obtained had an inherent viscosity of 0.83 dl/g at 35° C. at a concentration of 0.5 g/dl in p-chlorophenol.

Example 54

To a reaction vessel equipped with a stirrer, reflux condenser, nitrogen inlet tube and thermometer, 12.91 g (0.05 mol) of 4,4'-diphenyletherdicarboxylic acid, 18.60 g (0.11 mol) of DMC and 100 g of N,N-dimethylformamide were charged and stirred at 90° C. for 3 hours. The reaction mass was cooled to 50° C. and 6.26 g (0.025 mol) of 4,4'-thiobisbenzenethiol, 5.01 g (0.025 mol) of 4,4'-diaminodiphenyl ether and 18 g of pyridine were added and further stirred at 90° C. for 4 hours. The reaction mixture was poured into a large amount of isopropyl alcohol and stirred with a homogenizer at high rotation. The precipitated polymer was filtered, washed and dried to obtain white polymer. The polymer obtained had an inherent viscosity of 0.69 dl/g at 35° C. at a concentration of 0.5 g/dl in p-chlorophenol.

Example 55

To a reaction vessel equipped with a stirrer, reflux condenser, nitrogen inlet tube and thermometer, 25.82 g (0.10 mol) of 4,4'-diphenyletherdicarboxylic acid, 18.60 g (0.11 mol) of DMC and 150 g of N,N-dimethylformamide were charged and stirred at 90° C. for 3 hours. After cooling the reaction mass to 50° C., 12.52 g (0.10 mol) of p-aminothiophenol and 18 g of pyridine were added and further stirred at 90° C. for 4 hours. The reaction mixture was poured into a large amount of isopropyl alcohol and stirred with a homogenizer at high rotation. The precipitated polymer was filtered, washed and dried to obtain white polymer. The polymer obtained had an inherent viscosity of 0.73 dl/g at 35° C. at a concentration of 0.5 g/dl in p-chlorophenol.

Example 56

To a reaction vessel equipped with a stirrer, reflux condenser, nitrogen inlet tube and thermometer, 11.61 g (0.10 mol) of maleic acid, 33.82 g (0.20 mol) of DMC and 90 g of xylene were charged and stirred under reflux of xylene for 2 hours. After cooling to 60° C., 4.71 g (0.05 mol) of 1,2-ethanedithiol, 5.81 g (0.05 mol) of hexamethylenediamine and 18 g of pyridine were added and stirred again under reflux of xylene for 5 hours. After finishing the reaction, the reaction mass was cooled to room temperature and poured into a large amount of isopropyl alcohol. The precipitated polymer was filtered, washed and dried to obtain white polymer. The polymer obtained had an inherent viscosity of 0.77 dl/g at 35° C. at a concentration of 0.5 g/dl in p-chlorophenol.

Example 57

To a reaction vessel equipped with a stirrer, reflux condenser, nitrogen inlet tube and thermometer, 12.91 g (0.05 mol) of 4,4'-diphenyletherdicarboxylic acid, 18.60 g (0.11 mol) of DMC and 95 g of N,N-dimethylformamide were charged and stirred at 90° C. for 3 hours. After cooling the reaction mass to 50° C., 5.71 g (0.025 mol) of bisphenol A, 5.01 g (0.025 mol) of 4,4'-diaminodiphenyl ether and 18 g of pyridine were added and further stirred at 90° C. for 4 hours. The reaction mixture was poured into a large amount of isopropyl alcohol and stirred with a homogenizer at high rotation. The precipitated polymer was filtered, washed and dried to obtain white polymer. The polymer obtained had an inherent viscosity of 0.76 dl/g at 35° C. at a concentration of 0.5 g/dl in p-chlorophenol.

Example 58

To a reaction vessel equipped with a stirrer, reflux condenser, nitrogen inlet tube and thermometer, 25.82 g (0.10 mol) of 4,4'-diphenyletherdicarboxylic acid, 18.60 g (0.11 mol) of DMC and 145 g of N,N-dimethylformamide were charged and stirred at 90° C. for 3 hours. After cooling the reaction mass to 50° C., 10.91 g (0.10 mol) of p-aminophenol and 18 g of pyridine were added and further stirred at 90° C. for 4 hours. The reaction mixture was poured into a large amount of isopropyl alcohol and stirred with a homogenizer at high rotation. The precipitated polymer was filtered, washed and dried to obtain white polymer. The polymer obtained had an inherent viscosity of 0.94 dl/g at 35° C. at a concentration of 0.5 g/dl in p-chlorophenol.

Example 59

To a reaction vessel equipped with a stirrer, reflux condenser, nitrogen inlet tube and thermometer, 16.42 g (0.10 mol) of 4-hydroxycinnamic acid, 16.91 g (0.10 mol) of DMC and 120 g of N,N-dimethylformamide were charged and stirred at 130° C. for 2 hours. After cooling the reaction mass to 60° C., 13.71 g (0.10 mol) of p-aminobenzoic acid was added and stirred at 130° C. for 5 hours. Thereafter, 16.91 g (0.10 mol) of DMC was added and stirred at 130° C. for an hour. After finally adding 16 g of pyridine, the reaction mixture was cooled to room temperature and poured into a large amount of isopropyl alcohol and stirred with a homogenizer at high rotation. The precipitated polymer was filtered, washed and dried to obtain white polymer. The polymer obtained had an inherent viscosity of 0.65 dl/g at 35° C. at a concentration of 0.5 g/dl in p-chlorophenol.

Example 60

To a reaction vessel equipped with a stirrer, reflux condenser, nitrogen inlet tube and thermometer, 14.61 g (0.10 mol) of adipic acid, 33.82 g (0.20 mol) of DMC and 70 g of xylene were charged and stirred under reflux of xylene for 2 hours. After cooling the reaction mass to 60° C., 3.10 g (0.05 mol) of ethylene glycol, 5.81 g (0.05 mol) of hexamethylenediamine and 18 g of pyridine were added and further stirred under reflux of xylene for 5 hours. After finishing the reaction, the reaction mass was cooled to room temperature and poured into a large amount of isopropyl alcohol and stirred with a homogenizer at high rotation. The precipitated polymer was filtered, washed and dried to obtain white polymer. The polymer obtained had an inherent viscosity of 0.77 dl/g at 35° C. at a concentration of 0.5 g/dl in p-chlorophenol.

Example 61

To a reaction vessel equipped with a stirrer, reflux condenser, nitrogen inlet tube and thermometer, 14.61 g (0.10 mol) of adipic acid, 16.91 g (0.20 mol) of DMC and 65 g of xylene were charged and stirred under reflux of xylene for 2 hours. After cooling the reaction mass to 60° C., 6.11 g (0.10 mol) of 2-aminoethanol and 18 g of pyridine were added and further stirred under reflux of xylene for 5 hours. After finishing the reaction, the reaction mixture was cooled to room temperature and poured into a large amount of isopropyl alcohol and stirred with a homogenizer at high rotation. The precipitated polymer was filtered, washed and dried to obtain white polymer. The polymer obtained had an inherent viscosity of 1.12 dl/g at 35° C. at a concentration of 0.5 g/dl in p-chlorophenol.

Example 62

To a reaction vessel equipped with a stirrer, reflux condenser, nitrogen inlet tube and thermometer, 21.01 g (0.10 mol) of 1,3,5-benzenetricarboxylic acid, 50.72 g (0.30 mol) of DMC and 130 g of o-dichlorobenzene were charged and stirred at 130° C. for 2 hours. Successively, 15.02 g (0.075 mol) of 4,4'-diaminodiphenyl ether and 8.26 g (0.075 mol) of hydroquinone were added and further stirred at 130° C. for 4 hours. After cooling the reaction mass to 60° C., 48g of pyridine was added and stirred at 60° C. for 5 hours. The reaction mass was poured into a large amount of isopropyl alcohol and stirred with a homogenizer at high rotation. The precipitated polymer was filtered, washed and dried to obtain white polymer. The polymer formed gel like materials on intending to dissolve in various organic solvents. Thus inherent viscosity could not measured.

Example 63

To a reaction vessel equipped with a stirrer, reflux condenser, nitrogen inlet tube and thermometer, 19.21 g (0.10 mol) of trimellitic anhydride, 18.42 g (0.05 mol) of bis(3-aminophenoxy)biphenyl and 150 g of DMi were charged and stirred at room temperature for 4 hours. To the reaction mass, 33.81 g (0.20 mol) of DMC was added and stirred at 90° C. for 2 hours. Further, 12.52 g (0.05 mol) of 4,4'-thiobisbenzenethiol and 18 g of pyridine were added and stirred at 90° C. for 4 hours and 150° C. for 2 hours. After finishing the reaction, the reaction mass was cooled to room temperature and poured into a large amount of isopropyl alcohol. The polymer was precipitated by stirring with a homogenizer at high rotation. The polymer was filtered, washed and dried to obtain white polymer. The polymer thus obtained had an inherent viscosity of 0.63 dl/g at 35° C. at a concentration of 0.5 g/dl in p-chlorophenol.

Example 64

To a reaction vessel equipped with a stirrer, reflux condenser, nitrogen inlet tube and thermometer, 19.21 g (0.10 mol) of trimellitic anhydride, 5.81 g (0.05 mol) of hexamethylenediamine and 90 g of DMi were charged and stirred at room temperature for 4 hours. To the reaction mass, 33.81 g (0.20 mol) of DMC was added and stirred at 90° C. for 2 hours. Further, 4.71 g (0.05 mol) of 1,2-ethanedithiol and 18 g of pyridine were added and stirred at 90° C. for 4 hours and 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 0.89 dl/g at 35° C. at a concentration of 0.5 g/dl in p-chlorophenol.

Example 65

To a reaction vessel equipped with a stirrer, reflux condenser, nitrogen inlet tube and thermometer, 19.21 g (0.10 mol) of trimellitic anhydride, 18.42 g (0.05 mol) of bis(3-aminophenoxy)biphenyl and 140 g of DMi were charged and stirred at room temperature for 4 hours. To the reaction mass, 33.81 g (0.20 mol) of DMC was added and stirred at 90° C. for 2 hours. Further, 9.31 g (0.05 mol) of 4,4'-biphenol and 18 g of pyridine were added and stirred at 90° C. for 4 hours and at 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 0.82 dl/g at 35° C. at a concentration of 0.5 g/dl in p-chlorophenol.

Example 66

To a reaction vessel equipped with a stirrer, reflux condenser, nitrogen inlet tube and thermometer, 19.21 g (0.10 mol) of trimellitic anhydride, 5.81 g (0.05 mol) of hexamethylenediamine and 85 g of DMi were charged and stirred at room temperature for 4 hours. To the reaction mass, 33.81 g (0.20 mol) of DMC was added and stirred at 90° C. for 2 hours. Further, 3.10 g (0.05 mol) of ethylene glycol and 18 g of pyridine were added and stirred at 90° C. for 4 hours and at 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 1.04 dl/g at 35° C. at a concentration of 0.5 g/dl in p-chlorophenol.

Example 67

To a reaction vessel equipped with a stirrer, reflux condenser, nitrogen inlet tube and thermometer, 19.21 g (0.10 mol) of trimellitic anhydride, 5.81 g (0.05 mol) of hexamethylenediamine and 105 g of DMi were charged and stirred at room temperature for 4 hours. To the reaction mass, 33.81 g (0.20 mol) of DMC was added and stirred at 90° C. for 2 hours. Further, 10.01 g (0.05 mol) of 4,4'-diaminodiphenyl ether and 18 g of pyridine were added and stirred at 90° C. for 4 hours and at 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 1.14 dl/g at 35° C. at a concentration of 0.5 g/dl in p-chlorophenol.

Example 68

To a reaction vessel equipped with a stirrer, reflux condenser, nitrogen inlet tube and thermometer, 19.21 g (0.10 mol) of trimellitic anhydride, 18.42 g (0.05 mol) of bis(3-aminophenoxy)biphenyl and 130 g of DMi were charged and stirred at room temperature for 4 hours. To the reaction mass, 33.81 g (0.20 mol) of DMC was added and stirred at 90° C. for 2 hours. Further, 5.46 g (0.05 mol) of p-aminophenol and 18 g of pyridine were added and stirred at 90° C. for 4 hours and at 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 0.84 dl/g at 35° C. at a concentration of 0.5 g/dl in p-chlorophenol.

Example 69

To a reaction vessel equipped with a stirrer, reflux condenser, nitrogen inlet tube and thermometer, 19.21 g (0.10 mol) of trimellitic anhydride, 18.42 g (0.05 mol) of bis(3-aminophenoxy)biphenyl and 120 g of DMi were charged and stirred at room temperature for 4 hours. To the reaction mass, 33.81 g (0.20 mol) of DMC was added and stirred at 90° C. for 2 hours. Further, 3.05 g (0.05 mol) of 2-aminoethanol and 18 g of pyridine were added and stirred at 90° C. for 4 hours and at 150° C. for 2 hours. After finishing the reaction, the reaction mass was cooled to room temperature and poured into a large amount of isopropyl alcohol. Polymer was precipitated by stirring with a homogenizer at high rotation. The polymer was further filtered, washed and dried to obtain white polymer. The white polymer had an inherent viscosity of 0.77 dl/g at 35° C. at a concentration of 0.5 g/dl in p-chlorophenol.

Example 70

A mixture of 20.20 g (0.100 mol) of sabacic acid, 50.7 g of DMC and 150 g of ethylene dichloride was heated in a nitrogen atmosphere at 80° C. for an hour. To the mixture, 9.00 g (0.100 mol) of 1,4-butanediol and 158 g of pyridine were added and reacted at 80° C. for an hour. The polymer in the reaction mixture obtained had a weight average molecular weight of 100,000.

Example 71

A mixture of 5.90 g (0.050 mol) of succinic acid, 7.31 g (0.05 mol) of adipic acid, 50.7 g of DMC and 150 g of ethylene dichloride was heated in a nitrogen atmosphere at 80° C. for an hour. To the mixture, 9.00 g (0.100 mol) of 1,4-butanediol and 158 g of pyridine were added and reacted at 80° C. for an hour. The polymer in the reaction mixture obtained had a weight average molecular weight of 110,000.

Example 72

A mixture of 5.90 g (0.050 mol) of succinic acid, 7.31 g (0.05 mol) of adipic acid, 50.7 g of DMC and 150 g of ethylene dichloride was heated in a nitrogen atmosphere at 80° C. for an hour. To the mixture, 3.10 g (0.050 mol) of ethylene glycol, 4.51 g (0.050 mol) of 1,4-butanediol and 158 g of pyridine were added and reacted at 80° C. for an hour. The polymer in the reaction mixture obtained had a weight average molecular weight of 95,000.

Example 73

A mixture of 59.04 g (0.500 mol) of succinic acid, 45.51 g (0.505 mol) of 1,4-butanediol and 0.86 g of stannous oxide was heated with stirring in a nitrogen atmosphere at 150° C. for 2 hours under the atmospheric pressure while distilling water out of the reaction system. The oligomer of polybutylene succinate thus obtained had a weight average molecular weight 6,000.

After dissolving 22.5 g of powder of polybutylene succinate oligomer in 220 g of ethylene dichloride, 11.4 g of DMC was added and reacted at 80° C. for an hour. After cooling the reaction mixture to room temperature, 40 g of pyridine was dropwise added gradually. After finishing the dropwise addition, the reaction mixture was stirred for 30 minutes. The polymer in the reaction mixture had an weight average molecular weight of 110,000.

Example 74

A mixture of 59.04 g (0.500 mol) of succinic acid, 45.51 g (0.505 mol) of 1,4-butanediol and 0.86 g of stannous oxide was heated with stirring in a nitrogen atmosphere at 150° C. for 2 hours under the atmospheric pressure while distilling water out of the reaction system and successively, heated with stirring at 150° C./30 mmHg for 0.5 hours. The oligomer of polybutylene succinate thus obtained had a weight average molecular weight of 21,000.

After dissolving 22.8 g of powder of polybutylene succinate oligomer in 220 g of ethylene dichloride, 2.2 g of DMC was added and reacted at 80° C. for an hour. After cooling the reaction mixture to room temperature, 13 g of pyridine was dropwise added gradually. After finishing the dropwise addition, the reaction mixture was stirred for 30 minutes. The polymer in the reaction mixture had a weight average molecular weight of 205,000.

Example 75

A mixture of 59.04 g (0.500 mol) of succinic acid, 54.07 g (0.600 mol) of 1,4-butanediol and 0.86 g of stannous oxide was heated with stirring in a nitrogen atmosphere at 150° C. for 8 hours under the atmospheric pressure while distilling water out of the reaction system. The oligomer of polybutylene succinate thus obtained had a weight average molecular weight 1,500.

A mixture of 11.81 g (0.100 mol) of succinic acid, 60 g of DMC and 300 g of ethylene dichloride was heated at 80° C. for an hour and added to the solution of the above polybutylene succinate oligomer in 600 g of ethylene dichloride. To the mixture, 200 g of pyridine was gradually added dropwise and stirred for 30 minutes. The polymer in the reaction mixture had a weight average molecular weight of 100,000.

Example 76

A mixture of 59.04 g (0.500 mol) of succinic acid, 73.07 g (0.500 mol) of adipic acid, 119.36 g (1.01 mol) of 1,6-hexanediol and 0.86 g of stannous oxide was heated with stirring in a nitrogen atmosphere at 150° C. for 2 hours under the atmospheric pressure while distilling water out of the reaction system and successively, heated with stirring at 150° C./30 mmHg for 0.5 hours. The oligomer of copolyester thus obtained had a weight average molecular weight 27,000.

After dissolving 18.0 g of powder of the copolyester oligomer in 180 g of ethylene dichloride, 1.4 g of DMC was added and reacted at 80° C. for an hour. After cooling the reaction mixture to room temperature, 7.9 g of pyridine was dropwise added gradually. After finishing the dropwise addition, the reaction mixture was stirred for 30 minutes. The polymer in the reaction mixture had a weight average molecular weight of 180,000.

Example 77

A mixture of 73.07 g (0.500 mol) of adipic acid, 59.68 g (0.505 mol) of 1,6-hexanediol and 0.86 g of stannous oxide was heated with stirring in a nitrogen atmosphere at 150° C. for 2 hours under the atmospheric pressure while distilling water out of the reaction system and successively, heated with stirring at 150° C./30 mmHg for 0.5 hours. The oligomer of polyester thus obtained had an weight average molecular weight 24,000.

After dissolving 9.0 g of powder of the oligomer and 9.0 g of butylene succinate oligomer which was used in Example 74 were dissolved in 180 g of ethylene dichloride, 1.4 g of DMC was added and reacted at 80° C. for an hour. After cooling the reaction mixture to room temperature, 8.0 g of pyridine was dropwise added gradually. After finishing the dropwise addition, the reaction mixture was stirred for 30 minutes. The polymer in the reaction mixture had a weight average molecular weight of 185,000.

Example 78

A mixture of 73.07 g (0.500 mol) of adipic acid, 59.68 g (0.505 mol) of 1,6-hexanediol and 0.86 g of stannous oxide was heated with stirring in a nitrogen atmosphere at 150° C. for 2 hours under the atmospheric pressure while distilling water out of the reaction system and successively, heated with stirring at 150° C./30 mmHg for 0.5 hours. The oligomer of polyester thus obtained had a weight average molecular weight 24,000.

To the hexene adipate oligomer, 11.81 g (0.100 mol) of succinic acid, 9.01 g (0.100 mol) of 1,4-butanediol, 1,200 g of ethylene dichloride and 60 g of DMC were added and reacted at 80° C. for an hour. After cooling the reaction mixture to room temperature, 200 g of pyridine was dropwise added gradually. After finishing the dropwise addition, the reaction mixture was stirred for 30 minutes. The polymer in the reaction mixture had a weight average molecular weight of 100,000.

Example 79

To a 500 ml four necked flask equipped with a thermometer, stirrer and distillation tube, 20 g (0.2 mol) of 90% L-lactic acid and 11.8 g (0.10 mol) of succinic acid were charged and heated with stirring at 140° C. for 2 hours in a nitrogen atmosphere under the atmospheric pressure while distilling water out of the reaction system and successively heated with stirring at 140° C./30 mmHg for 0.5 hours while distilling water out of the reaction system.

After cooling the reaction mass to room temperature, 9.0 g (0.10 mol) of 1,4-butanediol and 285 g of ethylene dichloride were added and dissolved by heating to 80° C. To the solution, 68 g (0.4 mol) of DMC was added and reacted at 84° C. for 2 hours while ventilating nitrogen into the solution. The polymer in the reaction mixture obtained had a weight average molecular weight of 12,000. To the reaction mixture obtained, 79 g of pyridine was added and stirred for 5 minutes. The weight average molecular weight of the polymer in the reaction mixture was 147,000.

Example 80

To a 500 ml four necked flask equipped with a thermometer, stirrer and distillation tube, 100 g (1.0 mol) of 90% L-lactic acid, 0.36 g of stannous oxide and 72 g of o-dichlobenzene were charged and heated with stirring at 140° C. for 2 hours under the atmospheric pressure while distilling water out of the reaction system. Successively, a water separation tube was mounted so as to separate water from the solvent and to return the solvent alone to the reaction system and heated with stirring at 130° C. 200 mmHg for 8 hours. The polylactic acid in the reaction mixture obtained had a weight average molecular weight of 8,000.

To a 500 ml four necked flask equipped with a thermometer, stirrer and distillation tube, 59.04 g (0.500 mol) of succinic acid, 45.51 g (0.505 mol) of 1,4-butanediol and 0.86 g of stannous oxide were charged and heated with stirring in a nitrogen atmosphere under the atmospheric pressure at 150° C. for 2 hours while distilling water out of the reaction system, and further heated with stirring at 150° C./30 mmHg for 0.5 hours. Polybutylene succinate thus obtained had a weight average molecular weight of 27,000.

To a 500 ml four necked flask equipped with a thermometer, stirrer and distillation tube, 26.0 g of the above polylactic acid solution in o-dichlorobenzene, 3.44 g of the above polybutylene succinate and 135 g of ethylene dichloride were charged and dissolved by heating to 80° C. Successively, 2.4 g of pyridine and 1.7 g of DMC were charged and stirred for 5 minutes. The polymer in the reaction mixture had a weight average molecular weight of 223,000.

Example 81

To a 500 ml four necked flask equipped with a thermometer, stirrer and distillation tube, 100 g (1.0 mol) of 90% L-lactic acid, 0.36 g of stannous oxide and 72 g of o-dichlobenzene were charged and heated with stirring at 140° C. for 2 hours under the atmospheric pressure while distilling water out of the reaction system. Successively, a tube packed with 50 g of molecular sieve 3A was mounted so as to return the distilled solvent to the reaction system by way of the molecular sieve layer and heated with stirring at 130° C./200 mmHg for 8 hours. The polylactic acid in the reaction mixture obtained had a weight average molecular weight of 30,000.

To a 500 ml four necked flask equipped with a thermometer, stirrer and distillation tube, 73.08 g (0.500 mol) of adipic acid, 31.35 g (0.505 mol) of ethylene glycol and 0.95 g of stannous oxide were charged and heated with stirring in a nitrogen atmosphere under the atmospheric pressure at 150° C. for 2 hours while distilling water out of the reaction system, and further heated with stirring at 150° C./30 mmHg for 2 hours. Polyethylene adipate thus obtained had a weight average molecular weight of 71,000.

To a 500 ml four necked flask equipped with a thermometer, stirrer and distillation tube, 23.1 g of the above polylactic acid solution in o-dichlorobenzene, 6.9 g of the above polyethylene adipate, 0.34 g of DMC and 150 g of ethylene dichloride were charged and dissolved by heating to 80° C. Successively, 0.4 g of pyridine was charged and stirred for 15 minutes. The polymer in the reaction mixture had a weight average molecular weight of 299,000.

Example 82

To a flask, 51.2 g (0.512 mol) of 90% L-lactic acid and 5.00 g (0.064 mol) of 97% glycolic acid were charged and heated with stirring in a nitrogen atmosphere at 140° C. for 3 hours while removing water from the reaction mixture. A dehydrated product was obtained. After dissolving 3.00 g of the dehydrated product in 30 g of ethylene dichloride, 10.0 g of DMC was charged and reacted at 84° C. for 3.5 hours while ventilating nitrogen gas. The polymer obtained in the reaction mixture had a weight average molecular weight of 22,000.

Example 83

To a flask, 100 g (1.00 mol) of 90% L-lactic acid and 8.12 g (0.107 mol) of 97% glycolic acid were charged and heated with stirring in a nitrogen atmosphere at 140° C. for 3 hours while removing water from the reaction mixture. A dehydrated product was obtained. After dissolving 3.00 g of the dehydrated product in 30 g of ethylene dichloride, 18.5 g of DMC was charged and reacted at 84° C. for 3.5 hours while ventilating nitrogen gas. The polymer obtained in the reaction mixture had a weight average molecular weight of 68,000.

Successively, the reaction mixture was cooled to room temperature, 10 ml of pyridine was added and stirred for 10 minutes. The polymer in the reaction mixture had a weight average molecular weight of 110,000.

Example 84

To a flask, 71.3 g (0.713 mol) of 90% L-lactic acid and 5.53 g (0.0532 mol) of 4-hydroxybutyric acid were charged and heated with stirring in a nitrogen atmosphere at 140° C. for 3 hours while removing water from the reaction mixture. A dehydrated product was obtained. After dissolving 3.00 g of the dehydrated product in 30 g of ethylene dichloride, 20.1 g of DMC was charged and reacted at 80° C. for 3 hours while ventilating nitrogen gas. The polymer obtained in the reaction mixture had a weight average molecular weight of 65,000.

Example 85

After dissolving 4.43 g (0.0615 mol as lactic acid unit) of a lactic acid oligomer having a weight average molecular weight of 26,000, and 1.03 g (0.014 mol) of 97% glycolic acid in 90 g of ethylene dichloride, 10.3 g of DMC was added and reacted at 84° C. for an hour while ventilating nitrogen gas. The reaction mixture was cooled to room temperature and 10 ml of pyridine was gradually added dropwise. After dropwise addition, the mixture was stirred for 5 minutes. The polymer obtained in the reaction mixture had an weight average molecular weight of 132,000.

Example 86

After dissolving 20.1 g of a lactic acid oligomer having a weight average molecular weight of 26,000, and 3.23 g of a glycolic acid oligomer having a weight average molecular weight of 8,000 in 220 g of ethylene dichloride, 3.34 g of DMC was added and reacted at 80° C. for an hour while ventilating nitrogen gas. The reaction mixture was cooled to room temperature and 2 ml of pyridine was gradually added dropwise. After dropwise addition, the mixture was stirred for 5 minutes. The polymer obtained in the reaction mixture had a weight average molecular weight of 152,000.

Example 87

To a flask, 75.0 g (0.75 mol) of 90% L-lactic acid and 5.43 g (0.0522 mol) of 3-hydroxybutanoic acid were charged and heated with stirring in a nitrogen atmosphere at 140° C. for 3 hours while removing water from the reaction mixture. A dehydrated product was obtained. After dissolving 3.00 g of the dehydrated product in 30 g of ethylene dichloride, 20.5 g (0.121 mol) of DMC was charged and reacted at 80° C. for 3 hours while ventilating nitrogen gas. The polymer obtained in the reaction mixture had a weight average molecular weight of 66,000.

Example 88

To a flask, 71.0 g (0.71 mol) of 90% L-lactic acid and 6.01 g (0.0509 mol) of 3-hydroxyvaleric acid were charged and heated with stirring in a nitrogen atmosphere at 140° C. for 3 hours while removing water from the reaction mixture. A dehydrated product was obtained. After dissolving 3.23 g of the dehydrated product in 30 g of ethylene dichloride, 20.0 g (0.118 mol) of DMC was charged and reacted at 80° C. for 3 hours while ventilating nitrogen gas. The polymer obtained in the reaction mixture had a weight average molecular weight of 60,000.

Example 89

After dissolving 5.03 g (0.0699 mol as a lactic acid unit) of a lactic acid oligomer having a weight average molecular weight of 26,000, and 1.15 g (0.0111 mol) of 4-hydroxybutanoic acid in 90 g of ethylene dichloride, 10.0 g (0.0592 mol) of DMC was added and reacted at 84° C. for an hour while ventilating nitrogen gas. After cooling the reaction mixture to room temperature, 10.0 ml (0.124 mol) of pyridine was dropwise added gradually and stirred for 5 minutes. The polymer in the reaction mixture obtained had a weight average molecular weight of 132,000.

Example 90

To a 500 ml flask, 104 g (1.04 mol) of 90% L-lactic acid (TC644 BL: manufactured by PURAC Co.) and 79 g of o-dichlorobenzene were charged and dehydrated at 140° C. for 2 hours in a nitrogen atmosphere. The solution was cooled to room temperature and allowed to stand. The separated water layer was removed. Dehydrated lactic acid having a moisture content of 3.4% was thus obtained. The composition of lactic acid in the step was 36% of monomer, 38% of dimer and 23% of trimer.

After cooling 9.12 g of dehydrated lactic acid in 82.27 g of ethylene dichloride having a moisture content of 100 ppm, 19.18 g of DMC was added and reacted at 84° C. for 3.5 hours while ventilating nitrogen gas.

The polymer in the reaction mixture obtained had a weight average molecular weight of 24,000.

Example 91

After dissolving 4.02 g of lactic acid oligomer powder having a weight average molecular weight of 26,000 in 91.61 g of ethylene dichloride (hereinafter referred to simply ad EDC) having a moisture content of 60 ppm, 9.55 g of DMC was added and reacted at 84° C. for an hour while ventilating nitrogen gas. The polymer in the reaction mixture obtained had a weight average molecular weight of 48,000.

Example 92

After dissolving 8.0 g of lactic acid oligomer powder having a weight average molecular weight of 26,000 in 80 g of EDC having a moisture content of 3 ppm, 0.97 g of DMC was added and reacted at 68° C. for an hour while ventilating nitrogen gas. The polymer in the reaction mixture obtained had a weight average molecular weight of 32,000. The reaction mixture was cooled to room temperature and 4 ml of pyridine was gradually added dropwise. Stirring was further continued for 2 minutes after dropwise addition. The polymer in the reaction mixture obtained had a weight average molecular weight of 442,000. Further 160 g of EDC was added and stirred for 8 hours. The polymer in the reaction mixture had a weight average molecular weight of 566,000.

Example 93

To a 500 ml four necked flask equipped with a thermometer, distillation tube, cooling tube, ventilation tube and stirrer 200 g of lactide (PURASORB™ manufactured by PURAC Co.) and 80 g of water were charged and hydrolyzed at 90° C. for 8 hours in ventilation of nitrogen gas.

Successively, dehydration was carried out at 160° C. for 2 hours to obtain Polymer 1 having an average polymerization degree of 4 (Mn=300).

The same procedures as described on the above Polymer 1 were carried out except that dehydration was carried out for 8 hours. Polymer 2 thus obtained had an average polymerization degree of 8 (Mn=600).

The oligomer having an average polymerization degree of 4 was fractionated from 97% L-lactic acid (manufactured by Staley Co.) and the solvent was removed at 20° C. under the pressure of 30 Torr. The oligomer thus obtained and 1 g of DMC were dissolved in $CDCl_3$ and reacted at 50° C. for three days. The CI/MS sprectrum of reaction mass thus obtained had fragmentation peaks of 251 (n=3), 323 (n=4), 395 (n=5) and 467 (n=6).

Example 94

To a 500 ml four necked flask equipped with a thermometer, cooling tube, ventilation tube and stirrer, 75 g (0.260 mol as —COOH) of Polymer 1 and 225 g of dichloromethane were charged and dissolved. To the solution, 48.3 g (0.286 mol) of DMC was added and reacted at 40° C. for 13 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77 g of the acid chloride was obtained.

The acid chloride obtained had Mn of 900, Mw of 3,000, and carboxylic acid chloride of 8.0% (neutralization titration method) and 8.0% (silver nitrate titration method). Residual carboxylic acid and DMC were not found. 2-Chloropropionic acid obtained by hydrolysis of polymer was lower than detection limit (100 ppm by mollactic acid unit).

Elemental analysis C:48.06%, H:5.45%, O:42.75% and Cl:3.91% (observed) C:48.05%, H:5.45%, O:42.71% and Cl:3.96% (theoretical)

Example 95

To a 500 ml four necked flask equipped with a thermometer, cooling tube and stirrer, 75 g (0.130 mol as —COOH) of Polymer 2 and 225 g of dichloromethane were charged and dissolved. To the solution, 22.6 g (0.134 mol) of DMC was added and reacted at 40° C. for 13 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 76.4 g of acid chloride was obtained.

The acid chloride obtained had Mn of 940, Mw of 3,200, and carboxylic acid chloride of 7.7% by mol (neutralization titration method) and 7.7% by mol (silver nitrate titration method). Residual carboxylic acid and DMC were not found. 2-Chloropropionic acid obtained by hydrolysis of polymer was lower than detection limit (100 ppm by mol·lactic acid unit).

Elemental analysis C:48.15%, H:5.42%, O:42.75% and Cl:3.68% (observed) C:48.12%, H:5.45%, O:42.78% and Cl:3.65% (theoretical)

Example 96

To a 500 ml four necked flask equipped with a thermometer, cooling tube and stirrer, 75 g (0.130 mol as —COOH) of Polymer 2 and 225 g of toluene were charged and dissolved. To the solution, 22.2 g (0.131 mol) of DMC was added and reacted at 80° C. for 4 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 81.0 g of acid chloride was obtained.

The acid chloride obtained had Mn of 860, Mw of 2,600, and carboxylic acid chloride of 8.3% by mol (neutralization titration method) and 8.3% by mol (silver nitrate titration method). Residual carboxylic acid and DMC were not found. 2-Chloropropionic acid obtained by hydrolysis of polymer was 600 ppm by mol.

Elemental analysis C:48.18%, H:5.40%, O:42.75% and Cl:3.66% (observed) C:48.10%, H:5.45%, O:42.76% and Cl:3.68% (theoretical)

Example 97

To a 500 ml four necked flask equipped with a thermometer, cooling tube and stirrer, 75 g (0.130 mol as —COOH) of Polymer 2 and 225 g of toluene were charged and dissolved. To the solution, 22.2 g (0.131 mol) of DMC was added and reacted at 100° C. for 4 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 76.4 g of acid chloride was obtained.

The acid chloride obtained had Mn of 940, Mw of 2,800, and carboxylic acid chloride of 7.7% by mol (neutralization titration method) and 7.7% by mol (silver nitrate titration method). Residual carboxylic acid and DMC were not found. 2-Chloropropionic acid obtained by hydrolysis of polymer was 1,500 ppm by mol.

Elemental analysis C:48.12%, H:5.40%, O:42.74% and Cl:3.73% (observed) C:48.10%, H:5.44%, O:42.73% and Cl:3.72% (theoretical)

Reference Example 1

After individually dissolving 1.85 g of propionic acid chloride in a 7/3 (by volume) solvent mixture of dichloromethane/mathanol and 0.74 g of propionic acid in a 1l (by volume) solvent mixture of acetone/water, each solution obtained was respectively dilute to 100 ml with the same solvent mixture. In this step propionic acid chloride and propionic acid have a concentration of $2.0 \times 10^{-4}$ mol/ml and $1.0 \times 10^{-4}$ mol/ml, respectively. For each 1 ml of the solution obtained, titration was respectively carried out with a 1/100N sodium methoxide-methanol solution and an aqueous silver nitrate solution.

In the neutralization titration, $2.0 \times 10^{-4}$ mol was required to the first inflection point ($E_1$) and $1.0 \times 10^{-4}$ mol was required between the first and the second inflection points ($E_2$–$E_1$). In the silver titration, $2.0 \times 10^{-4}$ mol of silver nitrate was required to the end-point of titration.

Reference Example 2

To the reaction mass obtained in Examples 94 and 95, 2 moles of pyridine was added for 1 mole of DMC used, and polymerization was carried out at 40° C. Weight average molecular weight of the polymer obtained is illustrated in Table 1.

TABLE 1

(Polymerization results of each reaction mass)

| Experiment No. | Mw of Polylactic acid |
|---|---|
| Example 94 | 200,000 |
| Example 95 | 248,000 |

Example 98

To a 500 ml four necked flask equipped with a thermometer, cooling tube, ventilation tube and stirrer, 75 g (0.130 mol as —COOH) of Polymer 2 and 225 g of dichloromethane were charged and dissolved. To the solution, 22.6 g (0.134 mol) of DMC was added and reacted at 40° C. for 24 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.1 g of acid chloride was obtained.

The acid chloride obtained had Mn of 1,900, Mw of 6,000, and carboxylic acid chloride of 3.8% by mol (neutralization titration method) and 3.8% by mol (silver nitrate titration method). Residual carboxylic acid and DMC were not found. 2-Chloropropionic acid obtained by hydrolysis of polymer was lower than detection limit (100 ppm by mol/lactic acid unit).

Elemental analysis C:49.06%, H:5.54%, O:43.50% and Cl:1.89% (observed) C:49.04%, H:5.50%, O:43.59% and Cl:1.86% (theoretical)

Example 99

To a 500 ml four necked flask equipped with a thermometer, distillation tube, cooling tube, ventilation tube and stirrer 200 g of lactide (PURASORB L: manufactured by PURAC Co.) and 80 g of water were charged and hydrolyzed at 90° C. for 8 hours in ventilation of nitrogen gas.

Successively, dehydration was carried out at 160° C. for 12 hours to obtain Polymer 3 having an average polymerization degree of 13 (Mn=900).

The above lactic acid obtained by hydrolysis of lactide was dehydrated at 160° C. After distilling about 70 g of water, nitrogen was stopped and the degree of vacuum was gradually enhanced at 40° C. and polymerization was carried out at 15 Torr for 30 hours. Polymer 4 thus obtained had an average polymerization degree of 55 (Mn=4,000).

To a 500 ml four necked flask equipped with a thermometer, cooling tube, ventilation tube and stirrer, 75 g (0.0801 mol as —COOH) of Polymer 3 and 225 g of ethylene dichloride were charged and dissolved. To the solution, 14.0 g (0.0825 mol) of DMC was added and reacted at 80° C. for 5 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.0 g of acid chloride was obtained.

The acid chloride obtained had Mn of 5,000, Mw of 15,000, and carboxylic acid chloride of 1.4% by mol (neutralization titration method) and 1.4% by mol (silver nitrate titration method). Residual carboxylic acid and DMC were not found. 2-Chloropropionic acid obtained by hydrolysis of polymer was lower than detection limit (100 ppm by mol/lactic acid unit).

Elemental analysis C:49.61%, H:5.54%, O:44.14% and Cl:0.72% (observed) C:49.64%, H:5.54%, O:44.12% and Cl:0.71% (theoretical)

Example 100

To a 500 ml four necked flask equipped with a thermometer, cooling tube, ventilation tube and stirrer, 75 g (0.0189 mol as —COOH) of Polymer 4 and 225 g of toluene were charged and dissolved. To the solution, 3.2 g (0.0189 mol) of DMC was added and reacted at 60° C. for an hour in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.3 g of acid chloride was obtained.

The acid chloride obtained had Mn of 6,000, Mw of 18,000, and carboxylic acid chloride of 1.2% by mol (neutralization titration method) and 1.2% by mol (silver nitrate titration method). Residual carboxylic acid and DMC were not found. 2-Chloropropionic acid obtained by hydrolysis of polymer was lower than detection limit (100 ppm by mollactic acid unit).

Elemental analysis C:49.79%, H:5.50%, O:44.14% and Cl:0.57% (observed) C:49.70%, H:5.54%, O:44.17% and Cl:0.59% (theoretical)

Example 101

To a 500 ml four necked flask equipped with a thermometer, cooling tube, ventilation tube and stirrer, 75 g (0.0801 mol as —COOH) of Polymer 3 and 225 g of xylene were charged and dissolved. To the solution, 13.8 g (0.0817 mol) of DMC was added and reacted at 140° C. for 1 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.2 g of acid chloride was obtained.

The acid chloride obtained had Mn of 5,400, Mw of 18,000, and carboxylic acid chloride of 1.3% by mol (neutralization titration method) and 1.3% by mol (silver nitrate titration method). Residual carboxylic acid and DMC were not found. 2-Chloropropionic acid obtained by hydrolysis of polymer was 520 ppm by mol.

Elemental analysis C:49.68%, H:5.56%, O:44.14% and Cl:0.63% (observed) C:49.66%, H:5.54%, O:44.13% and Cl:0.68% (theoretical)

Example 102

To a 500 ml four necked flask equipped with a thermometer, cooling tube, ventilation tube and stirrer, 75 g (0.0801 mol as —COOH) of Polymer 3 and 225 g of xylene were charged and dissolved. To the solution, 13.8 g (0.0817 mol) of DMC was added and reacted at 150° C. for 1 hours in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.4 g of acid chloride was obtained.

The acid chloride obtained had Mn of 5,700, Mw of 18,000, and carboxylic acid chloride of 1.3% by mol (neutralization titration method) and 1.3% by mol (silver nitrate titration method). Residual carboxylic acid and DMC were not found. 2-Chloropropionic acid obtained by hydrolysis of polymer was 1,700 ppm by mol.

Elemental analysis C:49.60%, H:5.56%, O:44.13% and Cl:0.70% (observed) C:49.66%, H:5.53%, O:44.10% and Cl:0.70% (theoretical)

Reference Example 3

To the reaction mass obtained in Examples 98, 99, 100 and 101, 2 moles of pyridine was added for 1 mole of DMC used, and polymerization was carried out at 40° C. Weight average molecular weight of the polymer obtained is illustrated in Table 2.

TABLE 2

| (Polymerization results of each reaction mass) | |
|---|---|
| Experiment No. | Mw of Polylactic acid |
| Example 98 | 200,000 |
| Example 99 | 240,000 |
| Example 100 | 200,000 |
| Example 101 | 150,000 |

Example 103

To a 500 ml four necked flask equipped with a thermometer, cooling tube, ventilation tube and stirrer, 75 g (0.0801 mol as —COOH) of Polymer 3 and 225 g of toluene were charged and dissolved. To the solution, 14.0 g (0.0825 mol) of DMC was added and reacted at 100° C. for an hour in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.0 g of acid chloride was obtained.

The acid chloride obtained had Mn of 6,600, Mw of 20,000, and carboxylic acid chloride of 1.1% by mol (neutralization titration method) and 1.1% by mol (silver nitrate titration method). Residual carboxylic acid and DMC were not found. 2-Chloropropionic acid obtained by hydrolysis of polymer was lower than detection limit (100 ppm by mollactic acid unit).

Elemental analysis C:49.72%, C:49.72%, H:5.53%, O:44.24% and Cl:0.30% (observed) C:49.73%, H:5.54%, O:44.20% and Cl:0.32% (theoretical)

Example 104

To a 500 ml four necked flask equipped with a thermometer, cooling tube, ventilation tube and stirrer, 74.9 g (0.0180 mol as —COOH) of Polymer 4 and 225 g of toluene were charged and dissolved. To the solution, 3.0 g (0.0189 mol) of DMC was added and reacted at 100° C. for an hour in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.2 g of acid chloride was obtained.

The acid chloride obtained had Mn of 14,400, Mw of 43,200, and carboxylic acid chloride of 0.5% by mol (neutralization titration method) and 0.5% by mol (silver nitrate titration method). Residual carboxylic acid and DMC were not found. 2-Chloropropionic acid obtained by hydrolysis of polymer was lower than detection limit (100 ppm by mol/lactic acid unit).

Elemental analysis C:49.85%, H:5.57%, O:44.35% and Cl:0.23% (observed) C:49.87%, H:5.55%, O:44.33% and Cl:0.25% (theoretical)

Example 105

To a 500 ml four necked flask equipped with a thermometer, cooling tube, ventilation tube and stirrer, 75 g (0.0801 mol as —COOH) of Polymer 3 and 225 g of mesitylene were charged and dissolved. To the solution, 13.7 g (0.0809 mol) of DMC was added and reacted at 160° C. for 30 minutes in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 76.5 g of acid chloride was obtained.

The acid chloride obtained had Mn of 13,000, Mw of 39,000, and carboxylic acid chloride of 5,600 ppm by mol (neutralization titration method) and 5,600 ppm by mol (silver nitrate titration method). Residual carboxylic acid and DMC were not found. 2-Chloropropionic acid obtained by hydrolysis of polymer was 900 ppm by mol.

Elemental analysis C:49.82%, H:5.55%, O:44.25% and Cl:0.39% (observed) C:49.85%, H:5.55%, O:44.29% and Cl:0.32% (theoretical)

Example 106

To a 500 ml four necked flask equipped with a thermometer, cooling tube, ventilation tube and stirrer, 74.9 g (0.0180 mol as —COOH) of Polymer 4 and 225 g of mesitylene were charged and dissolved. To the solution, 3.3 g (0.0198 mol) of DMC was added and reacted at 160° C. for 30 minutes in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 76.8 g of acid chloride was obtained.

The acid chloride obtained had Mn of 40,000, Mw of 120,000, and carboxylic acid chloride of 1800 ppm by mol (neutralization titration method) and 1800 ppm by mol (silver nitrate titration method). Residual carboxylic acid and DMC were not found. 2-Chloropropionic acid obtained by hydrolysis of polymer was 1800 ppm by mol.

Elemental analysis C:49.98%, H:5.53%, O:44.35% and Cl:0.14% (observed) C:49.93%, H:5.55%, O:44.34% and Cl:0.18% (theoretical)

Reference Example 4

To the reaction mass obtained in Examples 103,104,105 and 106, 2 moles of pyridine was added for 1 mole of DMC used, and polymerization was carried out at 40° C. Weight average molecular weight of the polymer obtained is illustrated in Table 3.

TABLE 3

(Polymerization results of each reaction mass)

| Experiment No. | Mw of Polylactic acid |
|---|---|
| Example 103 | 130,000 |
| Example 104 | 132,000 |
| Example 105 | 80,000 |
| Example 106 | 40,000 |

Example 107

To a 500 ml four necked flask equipped with a thermometer, cooling tube, ventilation tube and stirrer, 75 g (0.0801 mol as —COOH) of Polymer 3 and 225 g of xylene were charged and dissolved. To the solution, 13.59 (0.0801 mol) of DMC was added by four portions so as to amount to 0.8 mol for mol of the terminal carboxyl group and reacted at 140° C. for an hour in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 77.0 g of acid chloride was obtained.

The acid chloride obtained had Mn of 40,000, Mw of 123,000, and carboxylic acid chloride of 0.2% by mol (neutralization titration method) and 0.2% by mol (silver nitrate titration method). Residual carboxylic acid and DMC were not found.

Elemental analyses C:49.99%, H:5.55%, O:44.45% and Cl:0.10% (observed) C:49.95%, H:5.55%, O:44.40% and Cl:0.09% (theoretical)

Example 108

To a 500 ml four necked flask equipped with a thermometer, cooling tube, ventilation tube and stirrer, 75 g (0.0189 mol as —COOH) of Polymer 4 and 225 g of xylene were charged and dissolved. To the solution, 3.2 g (0.0189 mol) of DMC was added by four portions so as to amount to 0.8 mol for mol of the terminal carboxyl group and reacted at 140° C. for an hour in ventilation of nitrogen gas. Successively, the solvent was distilled off and the degree of vacuum was set at 30 Torr. Drying was carried out at 40° C. for 24 hours under introduction of very small amount of nitrogen gas to dry up polymer. 76.8 g of acid chloride was obtained.

The acid chloride obtained had Mn of 46,800, Mw of 140,000, and carboxylic acid chloride of 0.2% by mol (neutralization titration method) and 0.2% by mol (silver nitrate titration method). Residual carboxylic acid and DMC were not found.

Elemental analyses C:49.98%, H:5.56%, O:44.45% and Cl:0.08% (observed) C:49.96%, H:5.55%, O:44.41% and Cl:0.08% (theoretical)

Reference Example 5

To the reaction mass obtained in Examples 107 and 108, 2 moles of pyridine was added for 1 mole of DMC used, and polymerization was carried out at 40° C. Weight average molecular weight of the polymer obtained is illustrated in Table 4.

TABLE 4

(Polymerization results of each reaction mass)

| Experiment No. | Mw of Polylactic acid |
|---|---|
| Example 107 | 81,000 |
| Example 108 | 93,000 |

Example 109

To a 1000 ml four necked flask equipped with a thermometer, distillation tube, cooling tube, ventilation tube and stirrer, 200 g of 90% L-lactic acid (TC644L: manufactured by PURAC Co.) containing 430 ppm by mol of pirviic acid and 200 ppm by mol or less of acetic acid, was charged and dehydrated at 160° C. for 8 hours under ventilation of nitrogen gas to obtain 130 g of (0.141 mol as —COOH) of a lactic acid oligomer having an average polymerization degree of 12.8. After the oligomer obtained was added to 520 g of dehydrated dichloromethane having a moisture content of 20 ppm and dissolved, 26.21 g (0.155 mol) of DMC was added and reacted at 40° C. for 13 hours. The solvent was evaporated and dried up from the reaction mass at 40° C. under reduced pressure of 30 Torr. The reduced pressure was returned to the atmospheric pressure by introduction of nitrogen gas. Polymer 5 thus obtained had a Mw of 5,700, the content of carboxylic acid chloride was $6.7 \times 10^{-4}$ mol/g. Carboxylic acid terminal could not be detected. 2-Chloropropionic acid obtained by hydrolyzing Polymer 5 was 100 ppm by mol or less/lactic acid unit.

To a 200 ml four necked flask equipped with a thermometer, distillation tube, cooling tube, ventilation tube and stirrer, 25 g of Polymer 5 and 75 g of dichloromethane were charged and dissolved. After a uniform solution was obtained, 1.32 g (0.0168 mol) of pyridine having a moisture content of 40 ppm was added and reacted at 40° C. for an hour. The reaction mass was dropwise added into isopropyl alcohol. Precipitated polylactic acid was filtered and dried at 80° C./160 Torr for overnight under nitrogen atmosphere. The polylactic acid thus obtained had Mw of 270,000. 2-Chloropropionic acid obtained by hydrolysis of polylactic acid was 100 ppm by mol or less/lactic acid unit.

Example 110

The reaction was carried out by the same procedures as Example 109 except that 1.98 g (0.0251 mol) of pyridine was added. Polylactic acid thus obtained had Mw of 270,000. 2-Chloropropionic acid obtained by hydrolysis of polylactic acid was 100 ppm by mol or less/lactic acid unit.

Example 111

The reaction was carried out by the same procedures as Example 109 except that 2.64 g (0.0334 mol) of pyridine was added. Polylactic acid obtained had Mw of 270,000. 2-Chloropropionic acid obtained by hydrolysis of polylactic acid was 100 ppm by mol or less/lactic acid unit.

Example 112

The reaction was carried out by the same procedures as Example 109 except that 6.63 g (0.0838 mol) of pyridine was added. Polylactic acid obtained had Mw of 273,000. 2-Chloropropionic acid obtained by hydrolysis of polylactic acid was 100 ppm by mol or less/lactic acid unit.

Example 113

The reaction was carried out by the same procedures as Example 111 except that the reaction temperature was 10° C. Polylactic acid obtained had Mw of 270,000. 2-Chloropropionic acid obtained by hydrolysis of polylactic acid was 100 ppm by mol or less/lactic acid unit.

Example 114

To a 200 ml four necked flask equipped with a thermometer, distillation tube, cooling tube, ventilation tube and stirrer, 25 g of Polymer 5 and 75 g of were charged and dissolved at 80° C. After a uniform solution was obtained, 2.64 g (0.0334 mol) of pyridine was added and reacted at 80° C. for 4 hours. The reaction mass was dropwise added into isopropyl alcohol. Precipitated polymer was filtered and dried at 80° C./160 mmHg for overnight under nitrogen atmosphere. The polymer thus obtained had Mw of 110,000. 2-Chloropropionic acid obtained by hydrolysis of the polymer was 250 ppm by mollactic acid unit.

Example 115

The reaction was carried out by the same procedures as Example 111 except that pyridine was replaced by 3.40 g (0.0334 mol) of triethylamine. Polylactic acid obtained had Mw of 270,000. 2-Chloropropionic acid obtained by hydrolysis of polylactic acid was 100 ppm by mol or less/lactic acid unit.

Example 116

To a 200 ml four necked flask equipped with a thermometer, distillation tube, cooling tube, ventilation tube and stirrer, 25 g of Polymer 5 and 75 g of toluene were charged and dissolved at 100° C. After a uniform solution was obtained, 2.64 g (0.0334 mol) of pyridine was added and reacted at 100° C. for an hour. The reaction mass was dropwise added into isopropyl alcohol. Precipitated polymer was filtered and dried at 80° C./160 Torr for overnight under nitrogen atmosphere. Polylactic acid thus obtained had Mw of 240,000. 2-Chloropropionic acid obtained by hydrolysis of polylactic acid was 280 ppm by mol/lactic acid unit. Residual carboxyl group was 30 ppm by mollactic acid unit.

Example 117

To a 200 ml flask, 20 g (0.022 mol on carboxyl group) of the oligomer obtained in Example 109 and 60 g of xylene were charged and uniformly dissolved by heating at 140° C. in a nitrogen atmosphere. To the solution, 3.72 g (0.022 mol) of DMC was added and reacted for an hour. Successively the reaction was continued at 140° C. for 20 hours. The reaction mass was dropwise added to isopropyl alcohol. Precipitated polylactic acid was filtered and dried overnight at 80° C./160 Torr under a nitrogen atmosphere. Polylactic acid had Mw of 210,000. 2-Chloropropionic acid obtained by hydrolysis of polylactic acid was 100 ppm by mol or less/lactic acid unit.

Example 118

DMC was reacted by carrying out the same procedures as described in Example 117. Successively, the reaction was continued at 160° C. for 20 hours and the same treatment as Example 111 was carried out. Polylactic acid obtained had Mw of 131,000. 2-Chloropropionic acid obtained by hydrolysis of polylactic acid was 100 ppm by mollactic acid unit.

Example 119

DMC was reacted by carrying out the same procedures as described in Example 117. Successively, the reaction was continued at 180° C. for 20 hours. Polylactic acid obtained by the same treatment as Example 111 had Mw of 120,000. 2-Chloropropionic acid obtained by hydrolysis of polylactic acid was 1,250 ppm by mol or less/lactic acid unit.

Example 120

To a 200 ml four necked flask equipped with a thermometer, distillation tube, cooling tube, ventilation tube and stirrer, 25 g of Polymer 5 and 75 g of xylene were charged and dissolved at 120° C. After a uniform solution was obtained, 0.636 g (0.008 mol) of pyridine was added and reacted at 120° C. for an hour. The reaction mass was dropwise added into isopropyl alcohol. Precipitated polymer was filtered and dried at 80° C./160 Torr for overnight under nitrogen atmosphere. Polylactic acid thus obtained had Mw of 150,000. 2-Chloropropionic acid obtained by hydrolysis of polylactic acid was 1010 ppm by mol/lactic acid unit.

Example 121

To a 200 ml four necked flask equipped with a thermometer, distillation tube, cooling tube, ventilation tube and stirrer, 25 g of Polymer 5 and 75 g of dichloromethane having a moisture content of 400 ppm were charged and dissolved. After a uniform solution was obtained, 1.32 g (0.0168 mol) of pyridine having a moisture content of 3,040 ppm was added and reacted at room temperature for 24 hours. The reaction mass was dropwise added into isopropyl alcohol. Precipitated polymer was filtered and dried at 80° C./160 Torr for overnight under nitrogen atmosphere. Polylactic acid thus obtained had Mw of 45,000. 2-Chloropropionic acid obtained by hydrolysis of polylactic acid was 100 ppm or less by mol/lactic acid unit.

Comparative Example 1

To a 500 ml four necked flask equipped with a thermometer, distillation tube, cooling tube, ventilation tube and stirrer, 400 g of 90% L-lactic acid (TC644L: manufactured by PURAC Co.) was charged and dehydrated with stirring at 85° C. at degree of vacuum of 100 Torr. After distilling out about 45 g of water, temperature and degree of Torr were gradually increased and the reaction was carried out at 200° C./15 Torr for 12 hours. The oligomer thus obtained had a number average molecular weight of 3,100.

To a flask, 100 g ($0.032 \times 10^{-2}$ mol as —COOH) of the oligomer obtained was charged, 200 ml of benzene was added, and the polymer was dissolved by stirring. To the solution, 4.6 g (0.039 mol) of thionyl chloride was added and reacted at 82° C. for 4 hours. At the step, carboxylic acid chloride was $8.7 \times 10^{-5}$ mol for 1g of acid chloride and carboxylic acid was $2.8 \times 10^{-4}$ mol for 1g of acid chloride. Successively, benzene was removed under degree of vacuum 100 Torr and reacted at 205° C. for 4 hours under degree of vacuum 15 Torr. After finishing the reaction, polylactic acid was dissolved in 200 ml of chloroform and then precipitated in a great amount of methanol. The precipitate was finished, washed with methanol and dried in vacuum at 30° C. for 24 hours. Polylactic acid obtained was 87 g. Polylactic acid obtained had Mw of 45,000 and Mn of 15,000. 2-Chloropropionic acid obtained by hydrolysis of polylactic acid was 200 ppm by mol/lactic acid unit.

Example 122

To a 500 ml four necked flask equipped with a thermometer, distillation tube, cooling tube, ventilation tube and stirrer, 200 g of 90% L-lactic acid (TC644L: manufactured by PURAC Co.) was charged and dehydrated in a nitrogen atmosphere at 160° C. for 8 hours. The lactic acid oligomer obtained was 130 g and had an average polymerization degree of 16.0 (Polymer 6).

To a 200 ml four necked flask equipped with a thermometer, cooling tube, ventilation tube and stirrer, 25 g (0.0271 mol as —COOH) of Polymer 6 and 75 g of dichloromethane were charged and dissolved. To the solution obtained, 5.04 g (0.0298 mol) of DMC was added and successively 4.71 g (0.0596 mol) of pyridine was added and reacted at 25° C. for an hour. The polymer obtained had Mw of 81,000 and Mn of 27,000. The reaction was further continued for 23 hours to obtain polymer having Mw of 284,000 and Mn of 95,000. The reaction mass was dropwise added to a large amount of isopropyl alcohol. The precipitated polymer was filtered, washed with isopropyl alcohol and dried overnight at 80° C./160 Torr in a nitrogen atmosphere to obtain 24.0 of polylactic acid. 2-Chloropropionic acid obtained by hydrolysis of the obtained polylactic acid was lower than detection limit (100 ppm by mol/lactic acid unit).

Example 123

To a 200 ml four necked flask equipped with a thermometer, cooling tube, ventilation tube and stirrer, 25 g (0.0271 mol as —COOH) of Polymer 6 and 75 g of dichloromethane were charged and dissolved. To the solution obtained, 5.04 g (0.0298 mol) of DMC was added and successively 7.07 g (0.0894 mol) of pyridine was added and reacted at 25° C. for an hour. The polymer obtained had Mw of 272,000 and Mn of 91,000. The reaction was further continued for 23 hours to obtain polymer having Mw of 284,000 and Mn of 95,000. The reaction mass was dropwise added to a large amount of isopropyl alcohol. The precipitated polymer was filtered, washed with isopropyl alcohol and dried overnight at 80° C./160 Torr in a nitrogen atmosphere to obtain 24.0 g of polylactic acid. 2-Chloropropionic acid obtained by hydrolysis of the obtained polylactic acid was lower than detection limit (100 ppm by mol/lactic acid unit).

Example 124

To a 200 ml four necked flask equipped with a thermometer, cooling tube, ventilation tube and stirrer, 25 g (0.0271 mol as —COOH) of Polymer 6 and 75 g of dichloromethane were charged and dissolved. To the solution obtained, 7.07 g (0.0894 mol) of pyridine was added and successively 5.04 g (0.0298 mol) of DMC was added and reacted at 25° C. for an hour. The polymer obtained had Mw of 105,000 and Mn of 35,000. The reaction was further continued for 23 hours to obtain polymer having Mw of 279,000 and Mn of 93,000. The reaction mass was dropwise added to a large amount of isopropyl alcohol. The precipitated polymer was filtered, washed with isopropyl alcohol and dried overnight at 80° C./160 Torr in a nitrogen atmosphere to obtain 24.0 g of polylactic acid. 2-Chloropropionic acid obtained by hydrolysis of the obtained polylactic acid was lower than detection limit (100 ppm by mol/lactic acid unit).

Example 125

To a 200 ml four necked flask equipped with a thermometer, cooling tube, ventilation tube and stirrer, 5.04 g (0.0298 mol) of DMC and 25 g of dichloromethane were charged and dissolved. To the solution, 7.07 g (0.0894 mol) of pyridine was added. The reaction mixture was brown. A solution obtained by dissolving 25 g (0.0271 mol as —COOH) of Polymer 6 in 50 g of dichloromethane was dropwise added into the above flask and reacted at 25° C. for an hour. The polymer obtained had Mw of 95,000 and Mn of 32,000. The reaction was further continued for 23 hours to obtain polymer having Mw of 253,000 and Mn of 84,000. The reaction mass was dropwise added into a large amount of isopropyl alcohol. The precipitated polymer was filtered, washed with isopropyl alcohol and dried overnight at 80° C./160 Torr in a nitrogen atmosphere to obtain 24.0 g of polylactic acid. 2-Chloropropionic acid obtained by hydrolysis of polylactic acid was lower than detection limit (100 ppm by mol/lactic acid unit).

The obtained polylactic acid was brown powder.

Example 126

The reaction was carried out by the same procedures as described in Example 122 except that the reaction was carried out at 100° C. The polymer obtained had Mw of 280,000 and Mn of 93,000. The reaction mass was dropwise added into a large amount of isopropyl alcohol.

Precipitated polymer was filtered washed with isopropyl alcohol and dried overnight at 80° C./160 Torr in a nitrogen atmosphere to obtain 24.0 g of polylactic acid. 2-Chloropropionic acid obtained by hydrolysis of polylactic acid was 120 ppm by mol lactic acid unit.

Example 127

The reaction was carried out by the same procedures as described in Example 122 except that pyridine was replaced by 6.03 g (0.0596 mol) of triethylamine. The polymer obtained had Mw of 54,000 and Mn of 18,000 in the case of reacting for an hour and 92,000 and Mn of 29,000 in the case of reacting for 24 hours respectively. The reaction mass was dropwise added into a large amount of isopropyl alcohol. Precipitated polymer was filtered washed with isopropyl alcohol and dried overnight at 80° C./160 Torr in a nitrogen atmosphere to obtain 23.3 g of polylactic acid. 2-Chloropropionic acid obtained by hydrolysis of polylactic acid was 2,500 ppm by mol lactic acid unit.

Example 128

To a 200 ml four necked flask equipped with a thermometer, cooling tube, ventilation tube and stirrer, 25 g (0.0271 mol as —COOH) of Polymer 6 and 75 g of dichloromethane were charged and dissolved. To the solution obtained, 3.84 g (0.0298 mol) of N,N-dimethylchloromethyleneiminium chloride was added and successively 4.71 g (0.0596 mol) of pyridine was added and reacted at 5° C. for 24 hours. Polylactic acid obtained had Mw of 50,000 and Mn of 17,000. The reaction mass was dropwise added to a large amount of isopropyl alcohol. The precipitated polymer was filtered, washed with isopropyl alcohol and dried overnight at 80° C./160 Torr in a nitrogen atmosphere to obtain 19.6 g of polylactic acid. 2-Chloropropionic acid obtained by hydrolysis of the obtained polylactic acid was 3,700 ppm by mol/lactic acid unit.

Example 129

To a 500 ml flask, 500 g (5.00 mol) of 90% L-lactic acid having a D-lactic acid content of 0.5% (manufactured by PURAC Co.) having a pyruvic acid content of 850 ppm by mol and acetic acid content of 300 ppm by mol, was charged and dehydrated at 160° C. for 8 hours, under nitrogen atmosphere. The oligomer obtained was 405.2 g yield and had a carboxyl content of 0.0012 mol/g and D-lactic acid content of 0.5%.

To a 300 ml flask, 50 g of the lactic acid oligomer (carboxyl group 0.06 mol) and 150 g of dichloromethane were charged and uniformly dissolved. Successively, 10.2 g (0.06 mol) of DMC was added and reacted at 45° C. for 10 hours while ventilating nitrogen gas. Thereafter 9.48 g (0.12 mol) of pyridine was added and reacted at 25° C. for an hour. After finishing the reaction, 200 g of heptane was added to crystallize the polymer, dichloromethane was distilled off by heating to 100° C., and the crystal was filtered, washed with 900 g of warm water and dried. Polylactic acid powder obtained had a weight average molecular weight of 180,000 and a D-isomer content of 0.5%.

Example 130

To a 500 ml flask, 500 g (4.89 mol) of 88% D-lactic acid having a L-lactic acid content of 1.5% (manufactured by PURAC Co. having a pyruvic acid content of 980 ppm by mol and acetic acid content of 200 ppm by mol) was charged and dehydrated at 160° C. for 8 hours under nitrogen atmosphere. The oligomer yielded was 398.7 g and had a carboxyl content of 0.0012 mol/g and L-lactic acid content of 1.5%.

To a 300 ml flask, 50 g (carboxyl group 0.06 mol) of the lactic acid oligomer and 150 g of dichloromethane were charged and uniformly dissolved. Successively, 10.2 g (0.06 mol) of DMC was added and reacted at 45° C. for 10 hours under ventilation of nitrogen gas. Thereafter 9.48 g (0.12 mol) of pyridine was added and reacted at 25° C. for an hour. After finishing the reaction, 200 g of heptane was added to crystallize the polymer, and dichloromethane was distilled off by heating to 100° C. The crystal was filtered, washed with 900 g of warm water and dried. Polylactic acid powder obtained had a weight average molecular weight of 79,000 and a L-isomer content of 1.5%.

Example 131

By mixing 25 g of the oligomer obtained in Example 129 with 25 g of the oligomer obtained in Example 130, 50 g of the oligomer mixture having a D-isomer content of 49.5% and L-isomer content of 50.5% was prepared. To a 300 ml flask, 50 g of the oligomer mixture and 150 g of the dichloromethane were charged and uniformly mixed. Successively, 10.2 g (0.06 mol) of DMC was added and reacted at 45° C. for 10 hours under ventilation of nitrogen gas. Thereafter 9.48 g (0.12 mol) of pyridine was added and reacted at 25° C. for an hour. After finishing the reaction, 200 g of heptane was added to crystallize the polymer, and dichloromethane was distilled off by heating to 100° C. The crystal was filtered, washed with 900 g of warm water and dried. Polylactic acid powder obtained had a weight average molecular weight of 185,000 and D-isomer content of 49.5%.

Comparative Example 2

To a 3000 ml flask equipped with a distillation tube, 500 g (5.00 mol) of 90% L-lactic acid (manufactured by PURAC Co.) having a D-lactic acid content of 0.5%, pyruvic acid content of 850 ppm by mol and acetic acid content of 300 ppm by mol was charged and heated with stirring at 130° C./50 mmHg for 3 hours while removing water from the reaction system. Successively, the distillation tube was disassembled, a Dien Stark trap was mounted as a substitute, 2.0 g of Sn powder and 1,750 g of diphenyl ether were added, and the mixture was refluxed by heating for 4 hours at 140° C./23 mmHg. Distilled diphenyl ether and water were separated in the Dien Stark trap and the water layer was successively discharged. Thereafter, the Dien Stark trap was replaced by a tube which was packed with 150 g of molecular sieve and reaction was continued at 130° C./18 mmHg. Diphenyl ether distilled by refluxing returns to the reaction system by way of the molecular sieve. After reacting for 10 hours. 1500 ml of chloroform was added to the reaction mixture, uniformly mixed and suction filtered to remove Sn powder. Chloroform solution thus obtained was mixed with 5000 ml of isopropyl alcohol. Separated polylactic acid powder was filtered and dried. The polylactic acid obtained had a average molecular weight of 151,000 and a D-isomer content of 1.9%.

Comparative Example 3

By mixing 250 g of the oligomer obtained in Example 129 with 250 g of the oligomer obtained in Example 130, 500 g of the oligomer mixture having a D-isomer content of 49.5% and L-isomer content of 50.5% was prepared.

To a 3000 ml flask equipped with a Dien Stark trap, 500 g of the oligomer mixture, 2.0 g of Sn powder and 1,750 g of diphenyl ether were charged and refluxed by heating at 140° C./23 mmHg for 4 hours. Distilled diphenyl ether separates from water in the Dien Stark trap and water layer was successively discharged. Thereafter, the Dien Stark trap was dismantled and a tube packed with 150 g of molecular sieve was mounted as a substitute so as to return the distilled diphenyl ether to the reaction system by way of the molecular sieve layer. After reacting at 130° C./18 mmHg for 10 hours, 1,500 ml of chloroform was added to the reaction mixture and suction-filtered to remove Sn powder. To the chloroform solution thus obtained, 5,000 ml of isopropyl alcohol was added and the precipitated polylactic acid powder was filtered and dried. The polylactic acid had an weight average molecular weight of 167,000 and a D-isomer content of 55.7%.

Example 132

To a 500 ml flask, 500 g (5.00 mol) of 90% L-lactic acid (manufactured by ADM Co.) having a D-isomer content of 0.5%, pyruvic acid content of 500 ppm by mol, and an acetic acid content of 300 ppm by mol was charged and dehydrated at 160° C. for 8 hours under nitrogen atmosphere. The oligomer obtained had the yield of 400.5 g and a carboxyl group content of 0.0011 mol/g. To a 1500 ml flask, 300 g (0.33 mol as carboxyl group) of the lactic acid oligomer and 900 g of xylene were charged and uniformly dissolved at 100° C. Successively 55.8 g (0.33 mol) of DMC was added and reacted at 100° C. for an hour under ventilation of nitrogen gas. Next, 52.2 g (0.66 mol) of pyridine was added and reacted at 100° C. for an hour. After finishing the reaction, the reaction mixture was cooled. The crystallized polymer was filtered, washed with 900 g of isopropyl alcohol and dried to obtain polylactic acid. The polylactic acid obtained was 255.0 g yield and had a weight average molecular weight of 104,000 and a D-isomer content of 0.8%.

The sample was fused in a metal molded having dimensions of 50×50×2 mm at 200° C. for 10 minutes and pressed under pressure of 100 kg/cm$^2$. After pressing, the cooling rate of the molded item in the mold was changed from quenching to 30° C./min, 10° C./min, and 5° C./min, successively. Haze of the molded item was measured. Results are illustrated in Table 5. The molded item was transparent in quenching and opaque in a slow cooling rate.

Example 133

To a 500 ml flask, 500 g (5.00 mol) of 90% L-lactic acid (manufactured by ADM Co.) having a D-isomer content of 0.5%, pyruvic acid content of 500 ppm by mol, and an acetic acid content of 300 ppm by mol was charged and dehydrated at 160° C. for 8 hours under nitrogen atmosphere. The oligomer obtained had the yield of 400.5 g and a carboxyl group content of 0.0011 mol/g. To a 1500 ml flask, 300 g (0.33 mol as carboxyl group) of the lactic acid oligomer and 900 g of dichloromethane were charged and uniformly dissolved. Successively 60.6 g (0.36 mol) of DMC was added and reacted at 45° C. for 10 hours under ventilation of nitrogen gas. Next, 57.0 g (0.72 mol) of pyridine was added and reacted at 25° C. for an hour. After finishing the reaction, 900 g of heptane was added. The crystallized polymer was filtered, washed with 900 g of warm water and dried to obtain polylactic acid. The polylactic acid obtained was 267.0 g yield and had a weight average molecular weight of 250,000 and a D-isomer content of 0.5%.

The sample was fused in a metal molded having dimensions of 50×50×2 mm 200° C. for 10 minutes and pressed under pressure of 100 kg/cm$^2$. After pressing, the cooling rate of the molded item in the mold was changed from quenching to 30° C./min, 10° C./min, and 5° C./min, successively. Haze of the molded item was measured. Results are illustrated in Table 5. The molded item was transparent in quenching and opaque in a slow cooling rate.

Comparative Example 4

To a 3000 ml flask equipped with a distillation tube, 500 g (5.00 mol) of 90% L-lactic acid (manufactured by ADM Co.) having a D-isomer content of 0.5%, pyruvic acid content of 500 ppm by mol, and an acetic acid content of 300 ppm by mol was charged and heated with stirring at 130° C./50 mmHg for 3 hours while removing water out of the reaction system. Successively, the distillation tube was disassembled and a Dien Stark trap was mounted as a substitute. After addition of 2.0 g of Sn powder and 1750 g of diphenyl ether, the mixture was refluxed by heating at 140° C./23 mmHg for 4 hours. Successively, the Dien Stark trap was replaced by a tube packed with 150 g of molecular sieve so as to return the distilled diphenyl ether to the reaction system by way of the molecular sieve. After reacting at 130° C./18 mmHg for 10 hours, 1500 ml of chloroform was added to the reaction mixture and Sn powder was suction-filtered. To the chloroform solution obtained, 5000 ml of isopropyl alcohol was added. The precipitated polylactic acid was filtered and dried.

The polymer had the yield of 334.8 g, a weight average molecular weight of 151,000 and a D-isomer content of 1.9%.

The sample was fused in a metal molded having dimensions of 50×50×2 mm 200° C. for 10 minutes and pressed under pressure of 100 kg/cm$^2$. After pressing, the cooling rate of the molded item in the mold was changed from quenching to 30° C./min, 10° C./min, and 5° C./min, successively. Haze of the molded item was measured. Results are illustrated in Table 5. The molded item had low Haze even under slow cooling rate. Thus the molded item was difficult to crystallized.

TABLE 5

| Exp. No. | D-isomer (%) | Mw | cooling condition | Haze | | |
|---|---|---|---|---|---|---|
| Ex. 132 | 0.8 | 104,000 | quenching | 1.0 | 1.1 | 0.9 |
| | | | 30° C./min | 5.8 | 6.6 | 6.4 |
| | | | 10° C./min | 59.7 | 60.5 | 60.2 |
| | | | 5° C./min | 91.5 | 92.4 | 92.4 |
| Ex. 133 | 0.5 | 250,000 | quenching | 0.8 | 0.9 | 0.9 |
| | | | 30° C./min | 84.4 | 84.7 | 83.9 |
| | | | 10° C./min | 92.4 | 92.5 | 92.2 |
| | | | 5° C./min | 93.2 | 93.2 | 92.9 |
| Comp. Ex. 4 | 1.9 | 151,000 | quenching | 1.6 | 1.7 | 1.6 |
| | | | 30° C./min | 1.6 | 1.6 | 1.7 |
| | | | 10° C./min | 1.6 | 1.8 | 1.8 |
| | | | 5° C./min | 17.5 | 20.0 | 16.9 |

Example 134

To a 100 ml separable flask equipped with thermometer, ventilation tube, cooling tube and stirrer, 19.8 g (0.1 mol) of 1,3-dibutyl-2-imidazolidinone having a moisture content of 676 ppm was charged, heated to 90° C. with stirring. 19.7 g (0.2 mol) of phosgene was introduced over 5 hours while maintaining the temperature in 90° C.–95° C., aged in 90° C.–95° C. for 2 hours while ventilating nitrogen gas, and degassed.

Successively, the reaction mixture was cooled to room temperature and 24.8 g of liquid product was obtained. The liquid product was analyzed by liquid chromatography. The conversion rate of 1,3-dibutyl-2-imidazolidinone was 93.5%. The yield of 1,3-dibutyl-2-chloro-imidazolinium chloride was 99.4% on the basis of 1,3-dibutyl-2-imidazolidinone.

Figure 2:
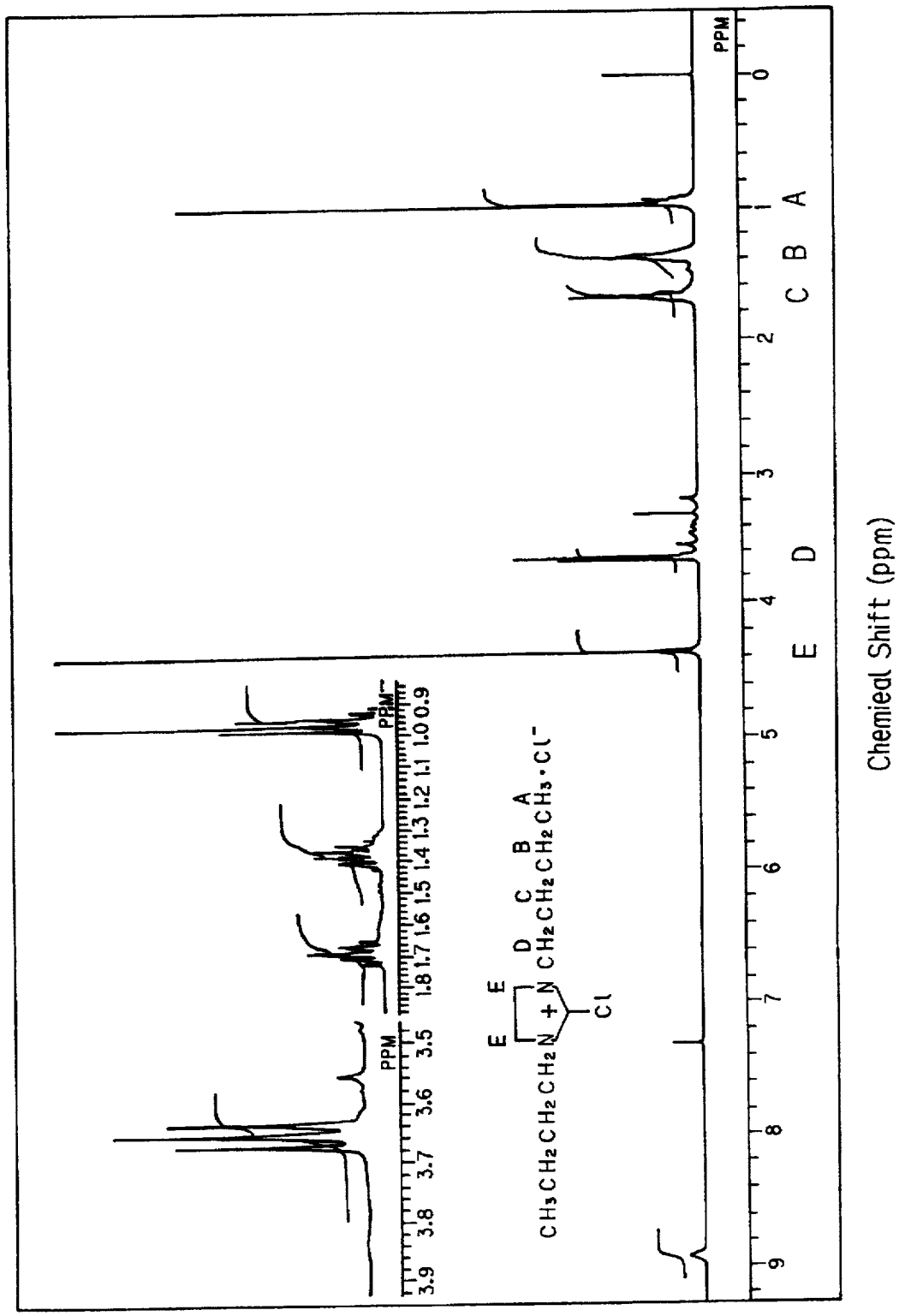
FIG. 2 illustrated an NMR-spectrum of 1,3-dibutyl-2-chloroimidazolinium chloride.

FIG. 1 illustrates an IR-spectrum and FIG. 2 illustrates an HNMR-spectrum.

Example 135

To a 500 ml four necked flask equipped with a thermometer, distillation tube, cooling tube, ventilation tube and stirrer, 200 g of 90% L-lactic acid (TC644L: manufactured by PURAC Co.) was charged and dehydrated in a nitrogen atmosphere at 160° C. for 8 hours. The lactic acid oligomer obtained was 125.5 g and had an average polymerization degree of 13.0.

To a 200 ml four necked flask equipped with a thermometer, cooling tube, ventilation tube and stirrer, 25 g (0.0267 mol as —COOH) of the lactic acid oligomer thus obtained and 75 g of dichloromethane were charged and dissolved. To the solution obtained, 7.84 g (0.0294 mol) of 2-chloro-1,3-dibutylimidazolinium chloride was added and reacted at 40° C. in a nitrogen atmosphere for 15 hours. Successively 4.65 g (0.0588 mol) of pyridine was added and reacted at 30° C. for 24 hours. The reaction mixture thus obtained was dropwise added to isopropyl alcohol. The precipitated polymer was filtered and dried at 80° C./160 mmHg in a nitrogen atmosphere to obtain polylactic acid. The polymer obtained had Mw of 275,000. 2-Chloropropionic acid obtained by hydrolysis of the obtained polymer was 100 ppm or less by mol/lactic acid unit.

Example 136

To a 200 ml four necked flask equipped with a thermometer, cooling tube, ventilation tube and stirrer, 25 g (0.0267 mol as —COOH) of the lactic acid oligomer obtained by the procedure of Example 135 and 75 g of dichloromethane were charged and dissolved. To the solution obtained, 7.84 g (0.0294 mol) of 2-chloro-1,3-dibutylimidazolinium chloride was added and successively 6.97 g (0.0882 mol) of pyridine was added and reacted at 30° C. in a nitrogen atmosphere for an hour. The reaction mixture thus obtained was dropwise added to isopropyl alcohol. The precipitated polymer was filtered and dried at 80° C./160 mmHg in a nitrogen atmosphere to obtain polylactic acid. The polymer obtained had Mw of 277,000. 2-Chloropropionic acid obtained by hydrolysis of the obtained polymer was 100 ppm or less by mol/lactic acid unit.

What is claimed is:

1. A process for preparing a polymer comprising carrying out polycondensation of a carboxyl group comprising compound and an active hydrogen group comprising compound in the presence of a haloiminium salt as a polycondensation agent.

2. The process according to claim 1 wherein polycondensation of a compound comprising a carboxyl group and an active hydrogen group in the same molecule is carried out.

3. The process according to claim 1 wherein polycondensation of a compound comprising two or more carboxyl groups and a compound comprising two or more active hydrogen groups is carried out.

4. The process according to claim 1 wherein polycondensation of a compound comprising one or more carboxyl groups and one or more active hydrogen groups in the same molecule and a compound comprising two or more carboxyl groups and/or a compound comprising two or more active hydrogen groups is carried out.

5. The process according to claim 4 wherein the active hydrogen group is an amino group and the polymer is polyamide.

6. The process according to claim 4 wherein the active hydrogen group is an amide group and the polymer is polyimide.

7. The process according to claim 4 wherein the active hydrogen group is a thiol group and the polymer is polythioester.

8. The process according to claim 4 wherein the active hydrogen group is a hydroxyl group and the polymer is polyester.

9. The process according to claim 2 wherein the compound comprising the carboxyl group and the active hydrogen group in the same molecule is a hydroxycarboxylic acid and/or an oligomer of the same and the polymer is polyester.

10. The process according to claim 3 wherein the compound comprising two or more active hydrogen groups is a compound comprising two or more hydroxyl groups and the polymer is polyester.

11. The process according to claim 4 wherein the compound comprising one or more carboxyl groups and one or more active hydrogen groups in the same molecule is hydroxycarboxylic acid, and the compound comprising two or more active hydrogen groups is a compound comprising two or more hydroxyl groups, and the polymer is polyester.

12. The process according to claim 9 wherein hydroxycarboxylic acid and/or the oligomer of the same is an aromatic compound and the polymer is aromatic polyester.

13. The process according to claim 9 wherein hydroxycarboxylic acid and/or the oligomer of the same is an aliphatic compound and the polymer is aliphatic polyester.

14. The process according to claim 10 wherein the compound comprising two or more hydroxyl groups is an aromatic compound and/or an aliphatic compound and the polymer is polyester.

15. The process according to claim 11 wherein hydroxycarboxylic acid is an aromatic compound and/or an aliphatic compound and the compound comprising two or more hydroxyl groups is an aliphatic compound and the polymer is polyester.

16. The process according to claim 13 wherein hydroxycarboxylic acid is lactic acid and/or the oligomer of the same and the polymer is polylactic acid.

17. The process according to claim 13 wherein hydroxycarboxylic acid is an oligomer obtained from butanediol and succinic acid and lactic acid and/or an oligomer of the same and the polymer is aliphatic copolyester.

18. The process according to claim 14 wherein the compound comprising two or more hydroxyl groups in butanediol and the compound comprising two or more carboxyl groups is succinic acid and the polymer is aliphatic polyester.

19. The process according to claim 15 wherein hydroxycarboxylic acid is lactic acid and/or the oligomer of the same, and the compound comprising two or more hydroxyl groups is butanediol, and the compound comprising two or more carboxyl groups is succinic acid, and the polymer is aliphatic copolyester.

20. The process for preparing polylactic acid of claim 16 wherein polycondensation is carried out at temperature at 100° C. or less in the presence of a base.

21. The process for preparing polylactic acid of claim 20 wherein the base for use is pyridine.

22. The process for preparing polylactic acid of claim 20 wherein lactic acid and the oligomer of the same contain 1,800 ppm or less of monocarboxylic acids and/or alcohols as impurities for lactic acid unit.

23. Polylactic acid prepared by the process according to claim 20 wherein the total amount of monocarboxylic acids and/or alcohols and/or 2-halopropionic acid which is formed by hydrolysis of polylactic acid obtained, is 1800 ppm or less for lactic acid unit.

24. A process for preparing polylactic acid comprising reacting acid halide of lactic acid and/or an oligomer of the same represented by the formula (1):

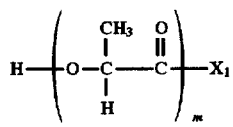

wherein $X_1$ is a halogen atom and m is an integer of 1 or more.

25. The process according to claim 24 wherein the reaction is carried out at temperature of 180° C. or less.

26. The process according to claim 24 wherein the reaction is carried out in the presence of a base.

27. The process according to claim 26 wherein the reaction is carried out at temperature of 120° C. or less.

28. Poly-L-lactic acid comprising 1% or less of D-isomer ratio in the repeating structural units.

29. Polylactic acid according to claim 28 wherein a weight average molecular weight is 50,000–1,000,000.

30. A process for preparing acid halide of lactic acid and/or an oligomer of the same represented by the formula (1):

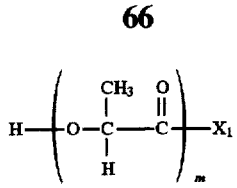

wherein $X_1$ is a halogen atom and m is an integer of 1 or more, comprising reacting haloiminium salt with lactic acid and/or an oligomer of the same.

31. The process according to claim 30 wherein m is 1–13.

32. The process according to claim 30 wherein m is 14–83.

33. The process according to claim 30 wherein m is 84–555.

34. The process according to claim 30 wherein m is 556 or more.

35. An acid halide of lactic acid and/or an oligomer of the same represented by the formula (1):

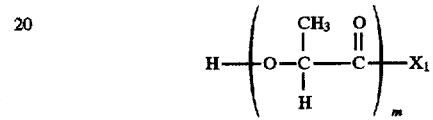

wherein $X_1$ is a halogen atom and m is an integer of 1 or more.

36. The acid halide of lactic acid and/or an oligomer according to claim 35 wherein m is 1–13.

37. The acid halide of lactic acid and/or an oligomer according to claim 35 wherein m is 14–83.

38. The acid halide of lactic acid and/or an oligomer according to claim 35 wherein m is 84–555.

39. The acid halide of lactic acid and/or an oligomer according to claim 35 wherein m is 556 or more.

40. The acid halide of lactic acid and/or an oligomer according to claim 39 wherein 1800 ppm or less of 2-halopropionic acid is formed by hydrolysis of the same.

41. The process according to claim 4 wherein haloiminium salt is represented by the formula (2):

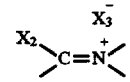

wherein $X_2$ and $X_3$ are a halogen atom and may be the same or different.

42. The process according to claim 4 wherein haloiminium salt is represented by the formula (3):

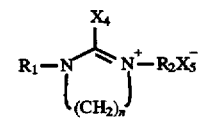

wherein $R_1$ and $R_2$ are individually a lower alkyl group and may be the same or different, $X_4$ and $X_5$ are a halogen atom and n is an integer of 2 or 3.

43. The process according to 4 wherein haloiminium salt is represented by the formula (4):

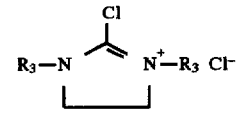

wherein $R_3$ is an alkyl group of 1–4 carbon atoms.

44. 1,3-Dibutyl-2-chloro-imidazolinium chloride.

45. The process according to claim 30 wherein haloiminium salt is represented by the formula (2):

wherein $X_2$ and $X_3$ are halogen atoms and may be the same or different.

46. The process according to claim 30 wherein haloiminium salt is represented by the formula (3):

wherein $R_1$ and $R_2$ are individually a lower alkyl group and may be the same or different, $X_4$ and $X_5$ are a halogen atom and n is an integer of 2 or 3.

47. The process according to claim 30 wherein haloiminium salt is represented by the formula (4):

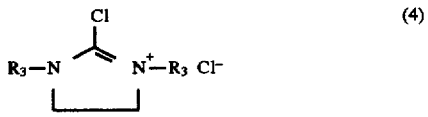

wherein $R_3$ is an alkyl group of 1–4 carbon atoms.

48. The process according to claim 30 wherein haloiminium salt is 1,3-dibutyl-2-chloro-imidazolinium chloride.

49. A polymer obtained by polycondensation of hydroxycarboxylic acid having an asymmetric carbon atom, wherein the ratio of D-isomer content to L-isomer content is maintained and an weight average molecular weight is 50,000–1,000,000.

50. The process according to claim 3 wherein the active hydrogen group is an amino group and the polymer is polyamide.

51. The process according to claim 2 wherein the active hydrogen group is an amino group and the polymer is polyamide.

52. The process according to claim 1 wherein the active hydrogen group is an amino group and the polymer is polyamide.

53. The process according to claim 3 wherein the active hydrogen group is an amide group and the polymer is polyimide.

54. The process according to claim 2 wherein the active hydrogen group is an amide group and the polymer is polyimide.

55. The process according to claim 1 wherein the active hydrogen group is an amide group and the polymer is polyimide.

56. The process according to claim 3 wherein the active hydrogen group is a thiol group and the polymer is polythioester.

57. The process according to claim 2 wherein the active hydrogen group is a thiol group and the polymer is polythioester.

58. The process according to claim 1 wherein the active hydrogen group is a thiol group and the polymer is polythioester.

59. The process according to claim 3 wherein the active hydrogen group is a hydroxyl group and the polymer is polyester.

60. The process according to claim 2 wherein the active hydrogen group is a hydroxyl group and the polymer is polyester.

61. The process according to claim 1 wherein the active hydrogen group is a hydroxyl group and the polymer is polyester.

62. The acid halide of lactic acid and/or an oligomer according to claim 38 wherein 1800 ppm or less of 2-halopropionic acid is formed by hydrolysis of the same.

63. The acid halide of lactic acid and/or an oligomer according to claim 37 wherein 1800 ppm or less of 2-halopropionic acid is formed by hydrolysis of the same.

64. The acid halide of lactic acid and/or an oligomer according to claim 36 wherein 1800 ppm or less of 2-halopropionic acid is formed by hydrolysis of the same.

65. The acid halide of lactic acid and/or an oligomer according to claim 35 wherein 1800 ppm or less of 2-halopropionic acid is formed by hydrolysis of the same.

66. The process according to claim 3 wherein haloiminium salt is represented by the formula (2):

wherein $X_2$ and $X_3$ are a halogen atom and may be the same or different.

67. The process according to claim 2 wherein haloiminium salt is represented by the formula (2):

wherein $X_2$ and $X_3$ are a halogen atom and may be the same or different.

68. The process according to claim 1 wherein haloiminium salt is represented by the formula (2):

wherein $X_2$ and $X_3$ are a halogen atom and may be the same or different.

69. The process according to claim 3 wherein haloiminium salt is represented by the formula (3):

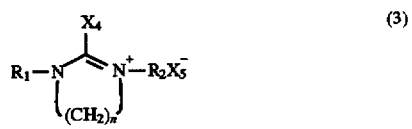

wherein $R_1$ and $R_2$ are individually a lower alkyl group and may be the same or different, $X_4$ and $X_5$ are a halogen atom and n is an integer of 2 or 3.

70. The process according to claim 2 wherein haloiminium salt is represented by the formula (3):

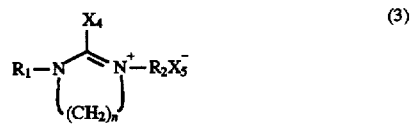

wherein $R_1$ and $R_2$ are individually a lower alkyl group and may be the same or different, $X_4$ and $X_5$ are a halogen atom and n is an integer of 2 or 3.

71. The process according to claim 1 wherein haloiminium salt is represented by the formula (3):

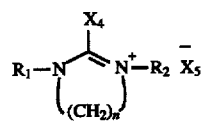

wherein $R_1$ and $R_2$ are individually a lower alkyl group and may be the same or different, $X_4$ and $X_5$ are a halogen atom and n is an integer of 2 or 3.

72. The process according to claim 3 wherein haloiminium salt is represented by the formula (4):

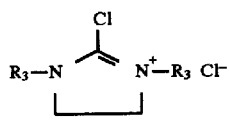

wherein $R_3$ is an alkyl group of 1–4 carbon atoms.

73. The process according to claim 2 wherein haloiminium salt is represented by the formula (4):

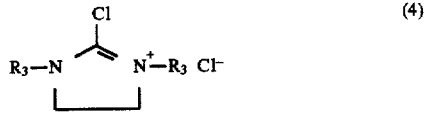

wherein $R_3$ is an alkyl group of 1–4 carbon atoms.

74. The process according to claim 1 wherein haloiminium salt is represented by the formula (4):

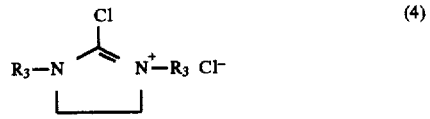

wherein $R_3$ is an alkyl group of 1–4 carbon atoms.